(12) United States Patent
Saito et al.

(10) Patent No.: US 11,568,132 B2
(45) Date of Patent: Jan. 31, 2023

(54) PHRASE GENERATION RELATIONSHIP ESTIMATION MODEL LEARNING DEVICE, PHRASE GENERATION DEVICE, METHOD, AND PROGRAM

(71) Applicant: NIPPON TELEGRAPH AND TELEPHONE CORPORATION, Tokyo (JP)

(72) Inventors: Itsumi Saito, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 188 days.

(21) Appl. No.: 16/977,049

(22) PCT Filed: Mar. 1, 2019

(86) PCT No.: PCT/JP2019/008245
§ 371 (c)(1),
(2) Date: Aug. 31, 2020

(87) PCT Pub. No.: WO2019/168189
PCT Pub. Date: Sep. 6, 2019

(65) Prior Publication Data
US 2021/0042469 A1 Feb. 11, 2021

(30) Foreign Application Priority Data
Mar. 2, 2018 (JP) .............................. JP2018-038055

(51) Int. Cl.
*G06F 40/20* (2020.01)
*G06F 40/58* (2020.01)
*G06F 40/289* (2020.01)

(52) U.S. Cl.
CPC ............ *G06F 40/20* (2020.01); *G06F 40/289* (2020.01); *G06F 40/58* (2020.01)

(58) Field of Classification Search
None
See application file for complete search history.

(56) References Cited

U.S. PATENT DOCUMENTS

2018/0190249 A1* 7/2018 Roblek ................. G06N 3/084
2018/0211164 A1* 7/2018 Bazrafkan ............ G06N 3/0454
(Continued)

FOREIGN PATENT DOCUMENTS

JP 2016170636 9/2016

OTHER PUBLICATIONS

Liwei Cai, William Yang Wang, "KBGAN: Adversarial Learning for Knowledge Graph Embeddings" arXiv:1711.04071v2 (Year: 2018).*

(Continued)

*Primary Examiner* — Richemond Dorvil
*Assistant Examiner* — Alexander G Marlow

(57) ABSTRACT

The present disclosure relates to concurrent learning of a relationship estimation model and a phrase generation model. The relationship estimation model estimates a relationship between phrases. The phrase generation model generates a phrase that relates to an input phrase. The phrase generation model includes an encoder and a decoder. The encoder converts a phrase into a vector using a three-piece set as learning data. The decoder generates, based on the converted vector and a connection expression or a relationship label, a phrase having a relationship expressed by the connection expression or the relationship label for the phrase. The relationship estimation model generates a relationship score from the converted vector, which indicates each phrase included in a combination of the phrases, and a (Continued)

vector indicating the connection expression and the relationship label.

17 Claims, 16 Drawing Sheets

(56) References Cited

U.S. PATENT DOCUMENTS

2019/0114348 A1* 4/2019 Gao .................. G06N 3/0472
2020/0159997 A1* 5/2020 Wu .................... G06N 3/0454
2021/0286948 A1* 9/2021 Kruengkrai .......... G06N 3/0454

OTHER PUBLICATIONS

Ashish Vaswani, Noam Shazeer, Niki Parmar, Jakob Uszkoreit, Llion Jones, Aidan N. Gomez, Lukasz Kaiser, Illia Polosukhin, "Attention Is All You Need" arXiv:1706.03762 (Year: 2017).*

Li et al. "Commonsense Knowledge Base Completion" Proceedings of the 54th Annual Meeting of the Association for Computational Linguistics, pp. 1445-1455, Berlin, Germany, Aug. 7-12, 2016 (Year: 2016).*

Maarten Sap, Ronan Le Bras, Emily Allaway, Chandra Bhagavatula, Nicholas Lourie, Hannah Rashkin, Brendan Roof, Noah A. Smith, Yejin Choi. "ATOMIC: An Atlas of Machine Commonsense for If-Then Reasoning". arXiv:1811.00146v2 (Year: 2018).*

Otomo, Kenichi, et al., "Acquisition of Situational relationship Knowledge by Using Co-occurrence Information of Predicate Term structure and Distribution of Internode Relations," A collection of papers presented at the 17th Annual Meeting of the Cosiety of Language Processing (Mar. 2011).

Li, Xiang, et al., "Commonsense Knowledge Base Completion," Proc. of ACL, Aug. 7, 2016.

Okawa, Yoshiki, et al. "A Proposal of a Language Mode for Response Generation with Emotion Esimation of Interlocutors," The 29th Annual Conference of the Japanese Society for Artificial Intelligence, May 30, 2015.

* cited by examiner

Fig. 6

KEITAIDENWA GA KOWARETA NODE XXX 5 O XXX 7 NI KAIKAEMASHITA.
(BECAUSE MY MOBILE PHONE WAS BROKEN, I REPLACED XXX5 WITH XXX7)

XXX NO KĒSU GA KOWARETEKITA NODE KAIKAETA.
(BECAUSE THE CASE OF XXX WAS BROKEN, I BOUGHT A NEW ONE.)

XXX GA KYUNI KOWARE, JYUDEN MO DEKI ZU, DENGEN GA HAIRANAKU NATTE SHIMAIMASHITA.
(XXX WAS SUDDENLY BROKEN, COULD NOT BE CHARGED, AND COULD NOT BE TURNED ON.)

XXX O OTOSHITE, KABĀ GA KOWARETE SHIMATTA.
(I DROPPED XXX AND THE COVER WAS BROKEN.)

HAHA NO KEITAI GA KOWARETA NODE, KINOU SUGU DDD NI ITTE ATARASHI NO O KAIMASHITA.
(BECAUSE MY MOTHER'S MOBILE PHONE WAS BROKEN, I QUICKLY WENT TO DDD YESTERDAY AND BOUGHT A NEW ONE.)

KEITAIDENWA GA SHURI NO TAME, TADAIMA, DAITAIKI NI NATCHAIMASHITA....
(BECAUSE MY MOBILE PHONE IS IN REPAIR, I HAVE NO OTHER CHOICE BUT TO USE A REPLACEMENT...)

Fig. 7

* 0 1D 1/2 2.003647
KEITAI (MOBILE) NOUN-VERBAL,*,*,*,, KEITAI, *KEITAI, KEITAI*
DENWA (PHONE) NOUN-VERBAL,*,*,*,, DENWA, *DENWA, DENWA*
GA PARTICLE-CASE-MISC,*,*,*,, GA, *GA, GA*

* 1 4D 0/2 -0.363607
KOWARE (BROKEN) VERB-MAIN,*,*, 1-ROW, CONJUNCTIVE, KOWARERU, *KOWARE, KOWARE, KOWARE*
TA AUXILIARY VERB,*,*,, SPECIAL-TA, BASE, TA, *TA, TA*
NODE PARTICLE-CONJUNCTIVE,*,*,*,, NODE, *NODE, NODE*

* 2 4D 1/2 -0.363607
XXX NOUN-COMMON,*,*,*,*,*
5 NOUN-NUMERIC,*,*,*,*,*
O PARTICLE-CASE-MISC,*,*,*,, O, *O, O*

* 3 4D 1/2 -0.363607
XXX NOUN-COMMON,*,*,*,*,*
7 NOUN-NUMERIC,*,*,*,*,*
NI PARTICLE-CASE-MISC,*,*,*,, NI, *NI, NI*

* 4 -1D 0/2 0.000000
KAIKAE (REPLACE) VERB-MAIN,*,*, 1-ROW, CONJUNCTIVE, KAIKAERU, *KAIKAE, KAIKAE, KAIKAE*
MASHI AUXILIARY VERB,*,*,, SPECIAL-MASU, CONJUNCTIVE, MASU, *MASHI, MASHI*
TA AUXILIARY VERB,*,*,, SPECIAL-TA, BASE, TA, *TA, TA*
. SYMBOL-COMMA,*,*,*,,.,.,.

EOS

| CONNECTION EXPRESSION |
|---|
| NODE |
| TE |
| SEIDE |
| ... |

(B)

| CONNECTION EXPRESSION | RELATION LABEL |
|---|---|
| NODE | CAUSE |
| TE | CAUSE |
| SEIDE | CAUSE |
| ... | ... |

PHRASE GENERATION RELATIONSHIP ESTIMATION MODEL LEARNING DEVICE, PHRASE GENERATION DEVICE, METHOD, AND PROGRAM

CROSS-REFERENCE TO RELATED APPLICATIONS

This application is a U.S. 371 Application of International Patent Application No. PCT/JP2019/008245, filed on 1 Mar. 2019, which application claims priority to and the benefit of JP Application No. 2018-038055, filed on 2 Mar. 2018, the disclosures of which are hereby incorporated herein by reference in their entireties.

TECHNICAL FIELD

The present invention relates to a phrase generation relationship estimation model learning device, a phrase generation device, a method for the same, and a program for the same.

BACKGROUND ART

There is a relationship estimation technique in which when a triple {phrase 1, phrase 2, label} consisting of two texts and a relation label (hereinafter referred to a label) indicating a relationship therebetween is given as input, a confidence score (hereinafter referred to a relation score) of the triple is output. The relation score is a numerical value indicating whether a triple {phrase 1, phrase 2, label} given as input is correct or not.

Non-Patent Literature 1 uses a corpus as input and uses co-occurrence information on a predicate-argument structure and a distribution of inter-node relations, to acquire the triple as inter-event relation knowledge.

Non-Patent Literature 2 estimates the relation score by learning a neural network using a large amount of manually generated triple data.

CITATION LIST

Non-Patent Literature

Non-Patent Literature 1: Kenichi Otomo, Tomohide Shibata, Yoshio Kurohashi, "Acquisition of inter-event relation knowledge using co-occurrence information on predicate-argument structure and a distribution of inter-node relations", Proceedings of the 17th Annual Meeting of the Language Processing Society (March 2011). Non-Patent Literature 2: Xiang Li, Aynaz Taheri, Lifu Tu, Kevin Gimpel, "Commonsense Knowledge Base Completion", Proc. of ACL, 2016.

SUMMARY OF THE INVENTION

Technical Problem

The relationship estimation of the prior art uses a triple {phrase 1, phrase 2, label} as input, to learn a model for outputting a relation score. Accordingly, when {phrase 1, label} is used as input and an attempt is made to estimate phrase 2, it needs to provide phrase 2, generate a triple {phrase 1, phrase 2, label}, and then calculate the relation score, which leads to a problem in that when {phrase 1, label} is used as input, phrase 1 and an arbitrary phrase 2 having a relationship defined by the label cannot be generated.

In order to solve the above problem, the present invention has been made, and an object of the present invention is to provide a phrase generation relationship estimation model learning device that can simultaneously learn a relationship estimation model that can accurately estimate a relationship between phrases and a phrase generation model that can generate a phrase having a relationship with an input phrase, a method for the same, and a program for the same.

Further, another object of the present invention is to provide a phrase generation device that can not only generate a phrase having a relationship with an input phrase but also estimate a relation score, a method for the same, and a program for the same.

Means for Solving the Problem

In order to achieve the above objects, a phrase generation relationship estimation model learning device according to the present invention is configured to include a learning unit that learns a phrase generation model that includes an encoder that uses, as learning data, a triple consisting of a pair of phrases and at least one of a connection expression representing a relationship between phrases and a relation label indicating a relationship represented by the connection expression, to convert the phrases to vectors, and a decoder that based on the converted vectors and the relation label indicating the connection expression or the relationship represented by the connection expression, generates a phrase having the relationship represented by the connection expression or the relation label with respect to the phrase; and a relationship estimation model that from the vectors representing the respective phrases contained in the pair of phrases and the vector representing the connection expression or the relation label, which are converted using the encoder, outputs a relation score.

A phrase generation relationship estimation model learning method according to the present invention is such that a learning unit learns a phrase generation model that includes an encoder that uses, as learning data, a triple consisting of a pair of phrases and at least one of a connection expression representing a relationship between phrases and a relation label indicating a relationship represented by the connection expression, to convert the phrases to vectors, and a decoder that based on the converted vectors and the relation label indicating the connection expression or the relationship represented by the connection expression, generates a phrase having the relationship represented by the connection expression or the relation label with respect to the phrase; and a relationship estimation model that from the vectors representing the respective phrases contained in the pair of phrases and the vector representing the connection expression or the relation label, which are converted using the encoder, outputs a relation score.

A phrase generation device according to the present invention is configured to include an input unit that receives a pair consisting of an input phrase and at least one of a connection expression representing a relationship between phrases and a relation label; a phrase generation unit that uses a preliminarily learned encoder that converts a phrase to a vector, to convert the input phrase to a vector, and uses a preliminarily learned decoder that generates a phrase having the relationship represented by the connection expression or the relation label with respect to the phrase, to generate a phrase having the relationship represented by the connection expression or the relation label with respect to the input phrase from the converted vector and the input connection expression or the input relation label; and an estimation unit that from the vectors representing the respective phrases contained in a pair of phrases and a vector representing the connection expression or the relation label, which are converted using the encoder, uses a preliminarily learned relationship estimation model that outputs a relation score, to output the relation score from a triple consisting of the pair and the generated phrase.

A phrase generation method according to the present invention is such that an input unit receives a pair consisting of an input phrase and at least one of a connection expression representing a relationship between phrases and a relation label; a phrase generation unit uses a preliminarily learned encoder that converts a phrase to a vector, to convert the input phrase to a vector, and uses a preliminarily learned decoder that generates a phrase having the relationship represented by the connection expression or the relation label with respect to the phrase, to generate a phrase having the relationship represented by the connection expression or the relation label with respect to the input phrase from the converted vector and the input connection expression or the input relation label; and an estimation unit uses a preliminarily learned relationship estimation model that from the vectors representing the respective phrases contained in a pair of phrases and a vector representing the connection expression or the relation label, which are converted using the encoder, outputs a relation score to output the relation score from a triple consisting of the pair and the generated phrase.

A program according to the present invention is a program for causing a computer to function as each unit constituting the phrase generation relationship estimation model learning device or the phrase generation device according to the present invention.

Effects of the Invention

The phrase generation relationship estimation model learning device, the method for the same, and the program for the same according to the present invention have an effect that it is possible to learn a phrase generation model that can generate a phrase having a relationship with an input phrase by learning the phrase generation model including an encoder that converts a phrase to a vector; and a decoder that from the converted vector and the connection expression or a relation label indicating the relationship represented by the connection expression, generates a phrase having the relationship represented by the connection expression or the relation label with respect to the phrase.

The phrase generation device, the method for the same, and the program for the same according to the present invention have an effect that a phrase having a relationship with an input phrase can be generated by using a phrase generation model including an encoder that converts a phrase to a vector from a pair consisting of a phrase and at least one of a connection expression and a relation label indicating the relationship represented by the connection expression; and a decoder that from the converted vector and the connection expression or a relation label indicating the relationship represented by the connection expression, generates a phrase having the relationship represented by the connection expression or the relation label with respect to the phrase.

BRIEF DESCRIPTION OF DRAWINGS

FIG. 6 is a diagram illustrating an example of input text.

FIG. 7 is a diagram illustrating an example of a dependency analysis result.

FIG. 8 is a diagram illustrating an example of a connection expression database.

DESCRIPTION OF EMBODIMENTS

Hereinafter, with reference to the accompanying drawings, embodiments of the present invention will be described in detail.

First Embodiment

<Outline of the First Embodiment of the Present Invention>

In relationship estimation, when a triple {phrase 1, phrase 2, label} consisting of two texts and a connection expression or a relation label indicating the relationship between the two texts is given as input, a confidence score (hereinafter referred to a relation score) of the triple is output.

The connection expression as used herein is an expression itself such as "node [conjunctive particle]", which represents a relation in a sentence, and the relation label is a label such as "reason" or "result", which represents the relation and abstracts the meaning of the connection expression. The label is a high-level concept including the connection expression and the relation label, and is label data such as "node [conjunctive particle]" and "reason".

For example, the input triple is {text 1: amegafuru (it rains), text 2: jimen ga nureru (ground gets wet), label: result} and the output is the relation score.

In the present embodiment, as the relation between two texts, a method for estimating whether the label is correct or not will be described.

Further, the embodiments of the present invention use a dependency structure, with a connection expression as a starting point, to extract a triple consisting of phrases and the connection expression connecting the phrases. Then, the extracted triple is used to learn a relationship estimation model that is a neural network model for estimating the relation.

<Configuration of the Relationship Estimation Device According to the First Embodiment of the Present Invention>

Figure 1:
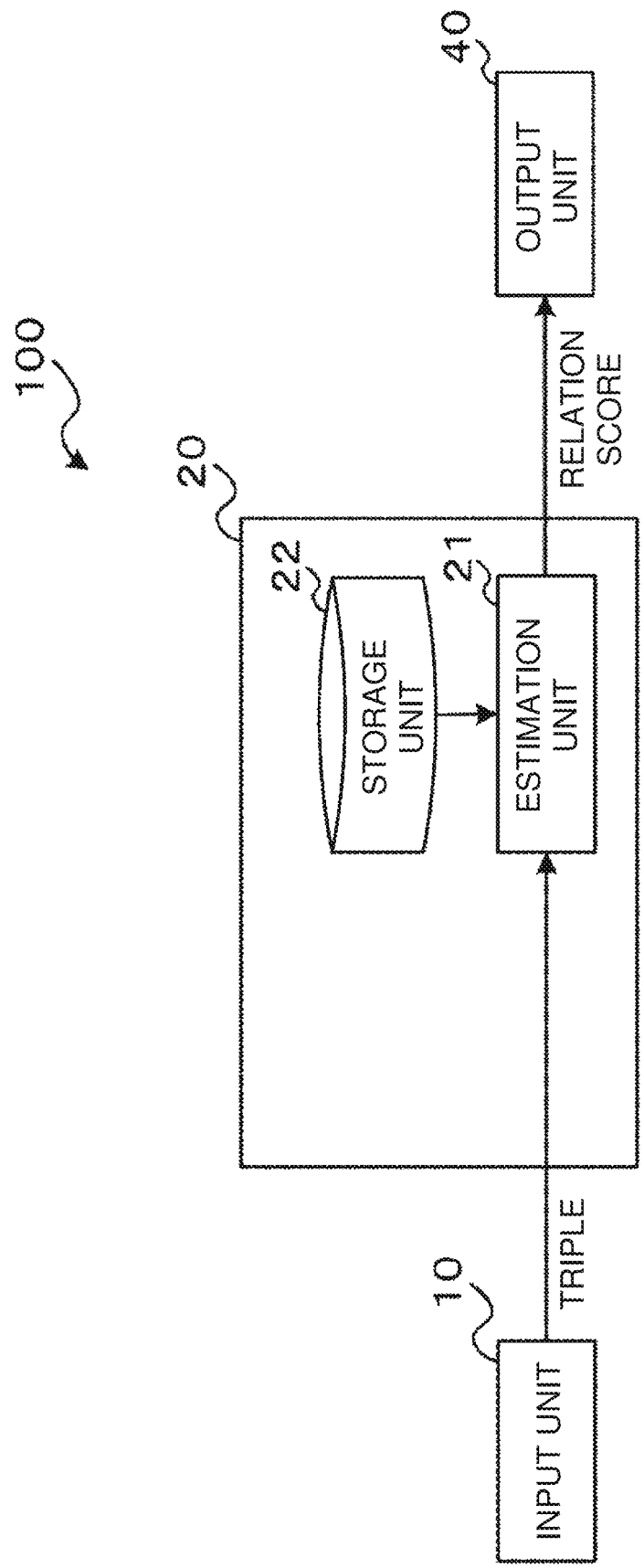
FIG. 1 is a block diagram illustrating a configuration of a relationship estimation device according to a first embodiment of the present invention.

The configuration of the relationship estimation device according to the first embodiment of the present invention will now be described. As illustrated in FIG. 1, a relationship estimation device 100 according to the first embodiment of the present invention can be configured by a computer including a CPU, a RAM, and a ROM storing programs and various data for executing a relationship estimation processing routine to be described later. The relationship estimation device 100 functionally includes an input unit 10, a calculation unit 20, and an output unit 40 as illustrated in FIG. 1.

The input unit 10 receives a triple {phrase 1, phrase 2, label} consisting of two phrases (texts) and a label that is a connection expression representing a relationship between the phrases.

Note that in the present embodiment, the description is made by taking an example in which the connection expression itself is used as the label indicating the relationship between the two texts contained in the triple.

The calculation unit 20 includes an estimation unit 21 and a storage unit 22.

The storage unit 22 stores a relationship estimation model learned by a relationship estimation model learning device 150 to be described later.

A neural network is used for the relationship estimation model and the learning method will be described later with the relationship estimation model learning device 150. The neural network may be any neural network. Alternatively, a different machine learning may be used, but the neural network is more effective.

The estimation unit 21 uses the relationship estimation model stored in the storage unit 22 to estimate the relation score with respect to the input triple and output the relation score from the output unit 40.

The relation score is a numerical value indicating whether or not the two phrases in the triple given as input have the relation indicated by the label. For example, the relation score takes a value of 0 to 1, and the closer to 1, the higher the relationship.

The processing of the estimation unit 21 will be described below.

First, the three inputs {phrase 1, phrase 2, label} are converted to the respective vectors.

Let h be a vector of the converted phrase 1, t be a vector of the converted phrase 2, and r be a vector of the connection expression. The conversion method may be any method as long as the method vectorizes a phrase or a word. The present embodiment uses the method of Non-Patent Literature 3.

[Non-Patent Literature 3] Tomas Mikolov, Ilya Sutskever, Kai Chen, Greg Corrado, and Jeffrey Dean. Distributed Representations of Words and Phrases and their Compositionality. In Proceedings of NIPS, 2013.

The following two methods can be considered for calculating the relation score.

(Score Calculation Method 1)

Figure 2:
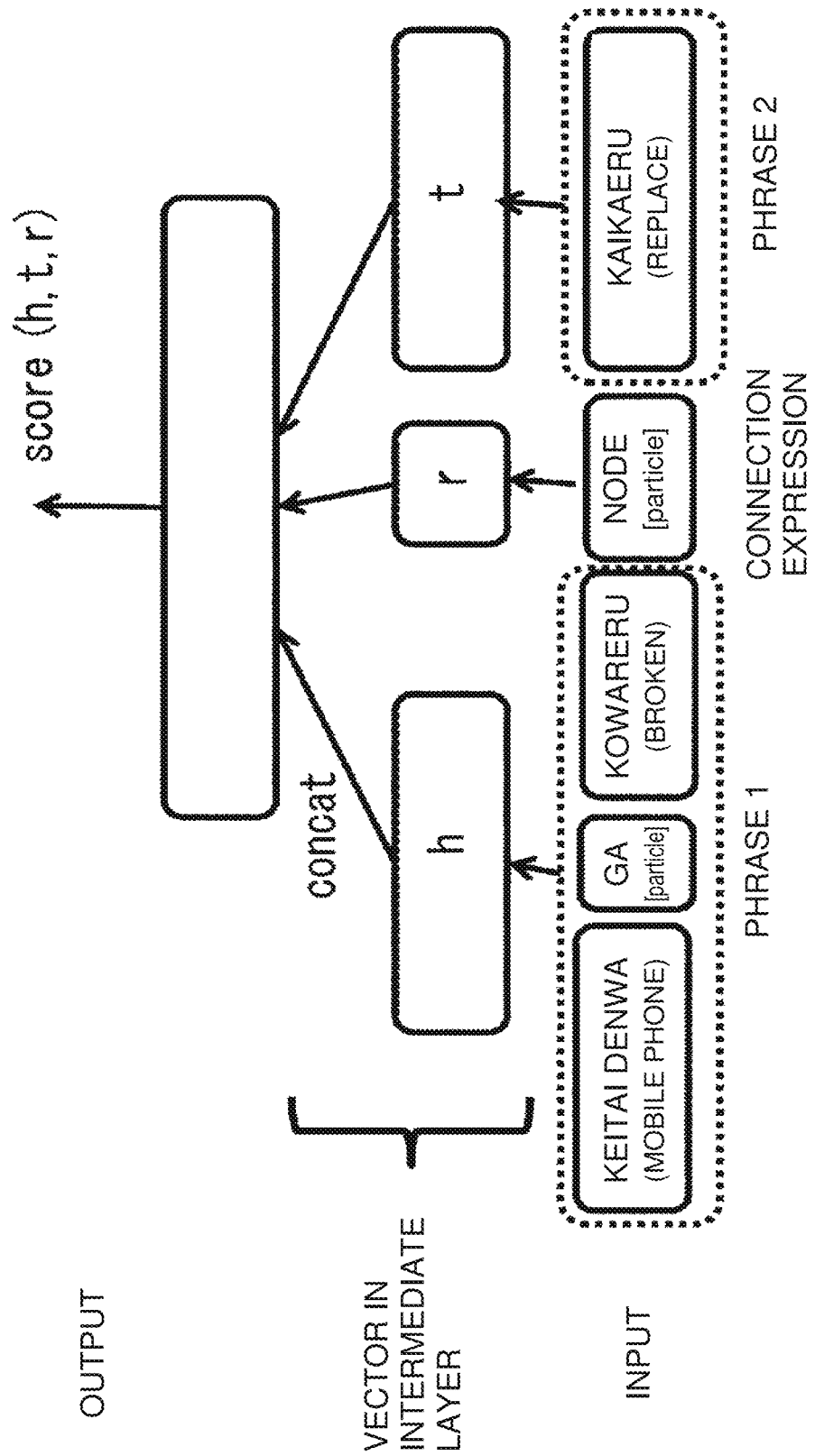
FIG. 2 is a diagram for explaining a relation score calculation method.

As illustrated in FIG. 2, h, t, and r are concatenated, and a relation score score(h, t, r), which is a one-dimensional output value, is output using a multilayer perceptron or the like.

(Score Calculation Method 2)

Figure 3:
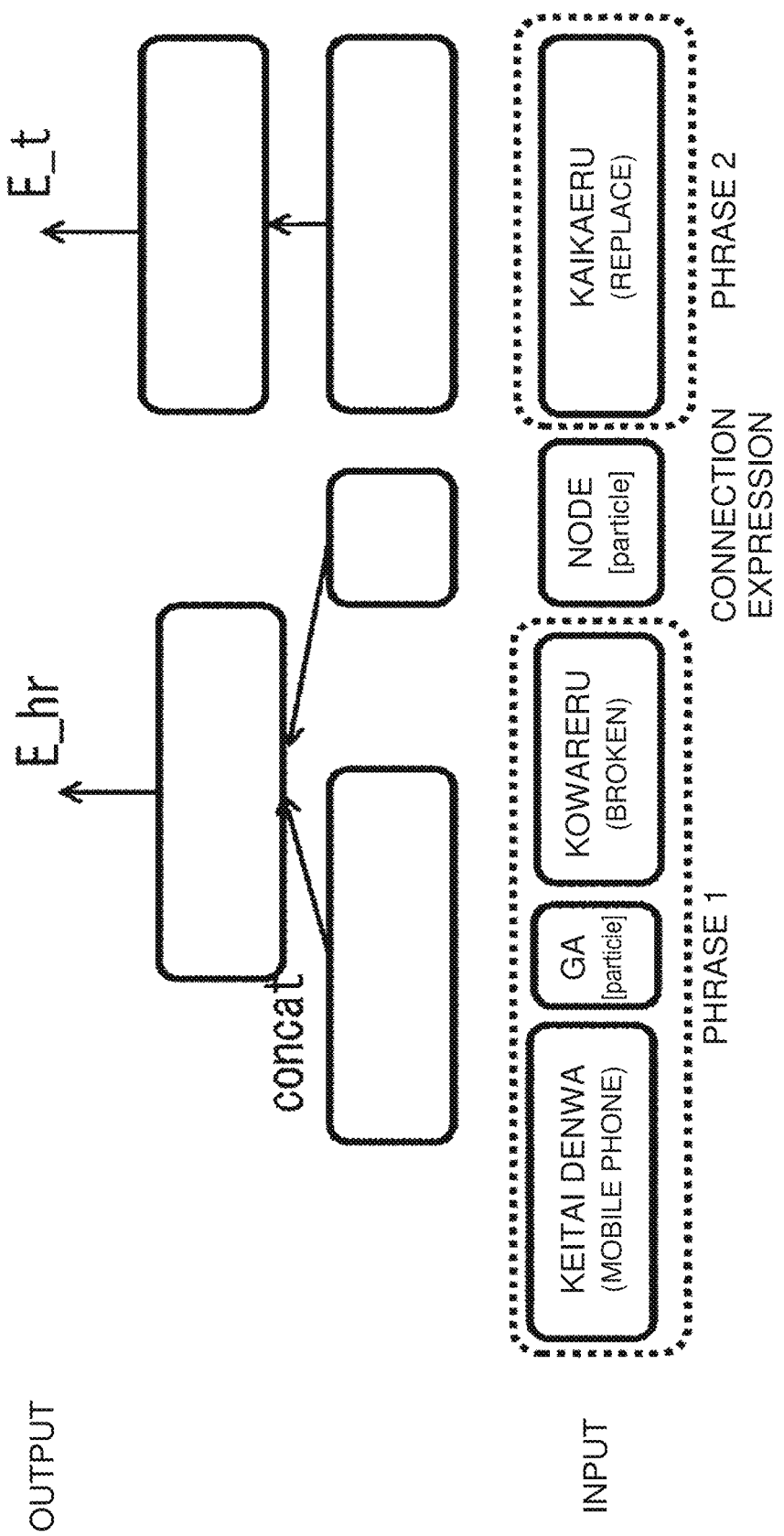
FIG. 3 is a diagram for explaining a relation score calculation method.

As illustrated in FIG. 3, h and r are concatenated, and an r-dimensional vector E_hr is output using a multilayer perceptron or the like, and an r-dimensional vector E_t is output from t using a multilayer perceptron or the like. Then, the relation score is calculated based on the closeness of E_hr and E_t. The closeness of the two vectors may be calculated, for example, using cosine similarity or the like.

For example, the estimation unit 21 outputs a relation score of 0.87 for the triple {phrase 1: amega furu (it rains), phrase 2: jimen ga nureru (ground gets wet), label: node [conjunctive particle]}.

In addition, the estimation unit 21 determines the output relation score by a predetermined threshold and estimates whether or not there is a relationship that the phrase 1 and the phrase 2 have a relationship of "result" indicated by "node". For example, when the value of the relation score is 0.6 and the threshold value is 0.4, it is estimated that there is a relationship because 0.6 is greater than 0.4. However, since the threshold determination may be required for knowledge acquisition or for reducing the score to 0/1, the value of the relation score may be output as is without performing the threshold determination depending on the application.

<Configuration of the Relationship Estimation Model Learning Device According to the First Embodiment of the Present Invention>

Figure 4:
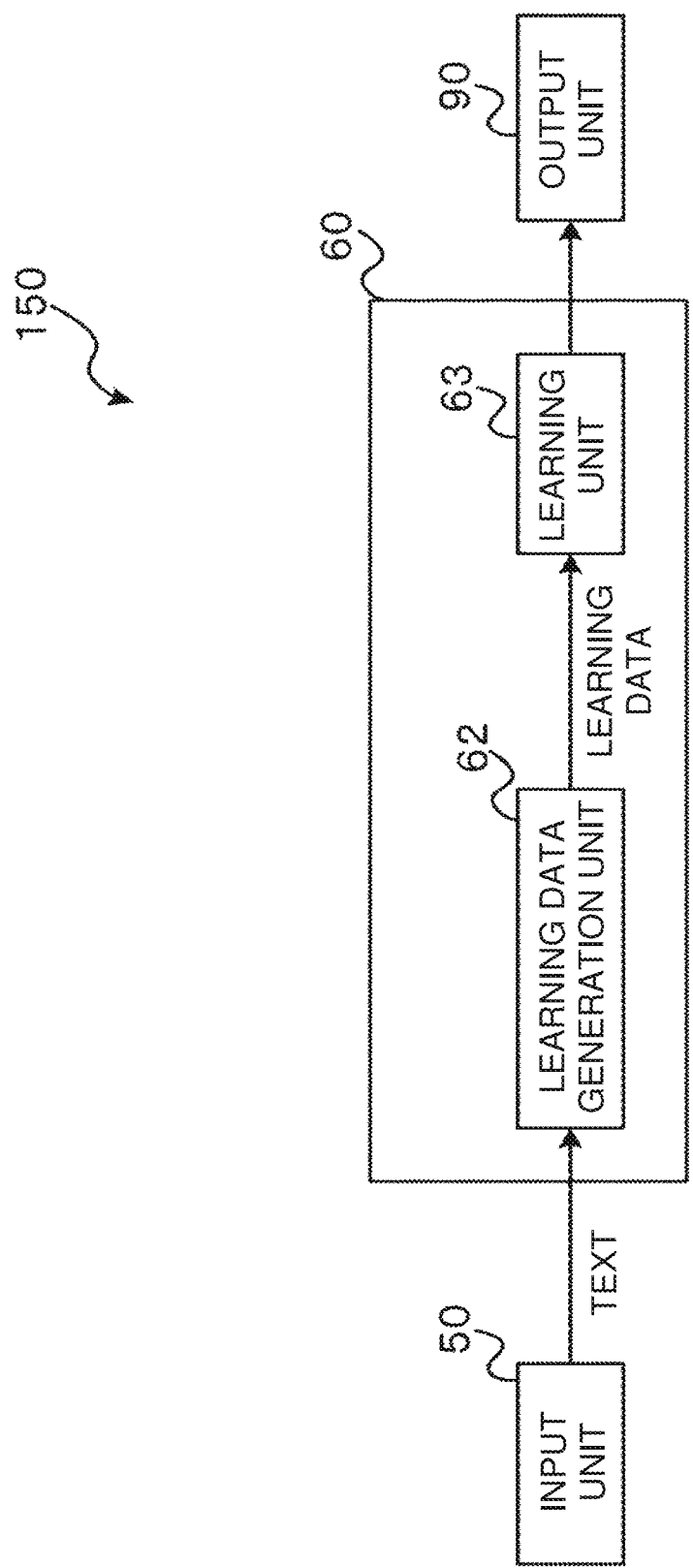
FIG. 4 is a block diagram illustrating a configuration of a relationship estimation model learning device according to the first embodiment of the present invention.

Then, the configuration of the relationship estimation model learning device according to the first embodiment of the present invention will be described. As illustrated in FIG. 4, the relationship estimation model learning device 150 according to the first embodiment of the present invention can be configured by a computer including a CPU, a RAM, and a ROM storing programs and various data for executing a relationship estimation model learning processing routine to be described later. The relationship estimation model learning device 150 functionally includes an input unit 50, a calculation unit 60, and an output unit 90 as illustrated in FIG. 4.

The input unit 50 receives an input text.

The calculation unit 60 includes a learning data generation unit 62 and a learning unit 63.

Figure 5:
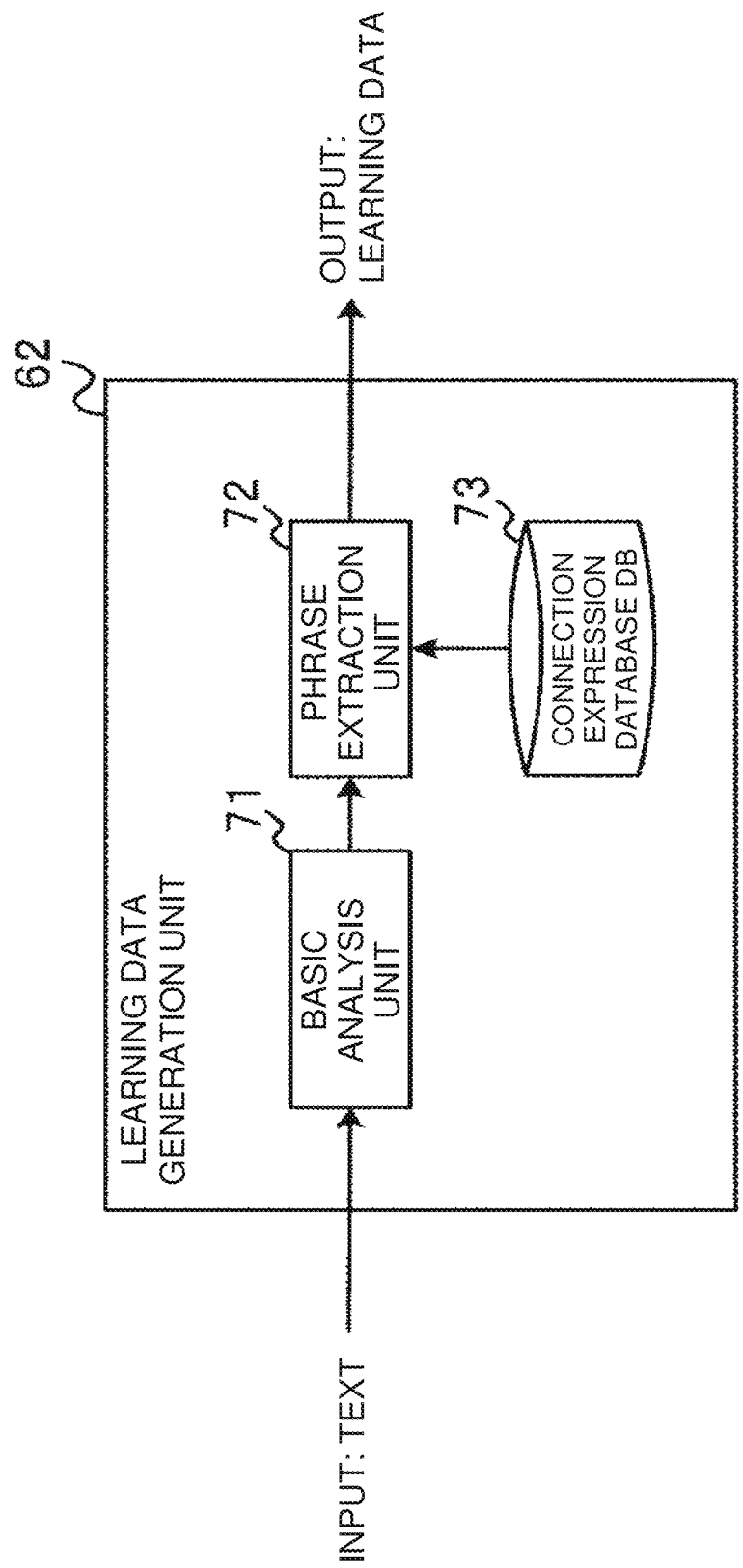
FIG. 5 is a block diagram illustrating a configuration of a learning data generation unit of the relationship estimation model learning device according to the first embodiment of the present invention.

As illustrated in FIG. 5, the learning data generation unit 62 includes a basic analysis unit 71, a phrase extraction unit 72, and a connection expression database 73.

The basic analysis unit 71 performs dependency analysis on an input text.

FIG. 6 illustrates an example of input text. FIG. 7 illustrates an example of a dependency analysis result. Any analyzer may be used for the dependency analysis, and for example, CaboCha, a known morphological analyzer, is used.

The phrase extraction unit 72 extracts a phrase from the dependency analysis result. The present embodiment assumes that the phrase includes a subject and a predicate in a dependency relation as the minimum unit, and other up to an n-number of adjective clauses (n is an arbitrary natural number).

As illustrated by an example of the dependency analysis result in FIG. 7, the following phrases are extracted. When a phrase is extracted, the original form of the analysis result (however, the original form is not necessarily required) is used to convert "kowareta node (broken and thus)" to "kowareru (break)", and "kaikaemashita (replaced)" to "kaikaeru (replace)" for extraction.

keitaidenwa ga kowareru (mobile phone is broken)
kaikaeru (replace)
xxx 7 ni kaikaeru (is replaced with xxx 7)
xxx 5 o kaeru (replace xxx5)

It should be noted that a phrase is basically extracted by assuming that a pair of a subject and a verb is used as a basic unit, but a sahen-noun verb alone may be used as a phrase.

Further, character strings before and after the connection expression may be extracted as the respective phrases without considering the dependency relationship. For example, when there is a sentence "aaaa [connection expression] bbbb", each of "aaaa" and "bbbb" may be extracted as a phrase. In this case, [connection expression] represents a segment containing the connection expression; and "aaaa" and "bbbb" represent the phrases having a positional relationship of being before and after across the segment containing the connection expression.

Then, the phrase extraction unit 72 extracts a phrase containing the connection expression and a phrase having a dependency relation with the segment from the pair of phrases and generates a triple consisting of {phrase 1, phrase 2, connection expression}.

The present embodiment assumes that the connection expression used as the label is predetermined by an expression representing a relationship between phrases. Examples of the connection expression may include conjunctions such as "nanode", "node", "tame ni", "to", "tara", "baai", "toki", "toki", "ba", "kara", and "ga". As illustrated in FIG. 8(A), the present embodiment assumes that the connection expressions are preliminarily stored in the connection expression database 73.

In the example of the dependency analysis results in FIG. 7, the following triples are generated.

{keitaidenwa ga kowareru (mobile phone is broken), kaikaeru (replace), node [conjunctive particle]} {keitaidenwa ga kowareru (mobile phone is broken), xxx 7 ni kaikaeru (replaced with xxx7), node [conjunctive particle]} {keitaidenwa ga kowareru (mobile phone is broken), xxx 5 o kaikaeru (replace xxx5), node [conjunctive particle]}

Assuming that there are N types of connection expressions, there are N types of labels contained in the final triple.

In addition to the above described method (extraction method 1) of extracting a triple and outputting it as is, another embodiment of the phrase extraction unit 72 includes a method of performing the following three types of processing after extraction.

(Extraction Method 2)

As illustrated in FIG. 8(B), the present embodiment assumes that a connection expression and a relation label indicating a relationship represented by the connection expression are preliminarily stored in the connection expression database 73.

The connection expression database 73 is used to convert the connection expression to the relation label and then to output a triple {phrase 1, phrase 2, relation label}.

In the above example of the dependency analysis results in FIG. 7, the following triples are generated.

{keitaidenwa ga kowareru (mobile phone is broken), kaikaeru (replace), cause} {keitaidenwa ga kowareru (mobile phone is broken), xxx 7 ni kaikaeru (is replaced with xxx7), cause} {keitaidenwa ga kowareru (mobile phone is broken), xxx 5 o kaikaeru (replace xxx5), cause}

Assuming that there are M types of relation labels, M types of labels are finally output.

When the above extraction method 2 is used, the relationship estimation device 100 uses a triple {phrase 1, phrase 2, relation label} as input.

(Extraction Method 3)

The triple {phrase 1, phrase 2, relation label} obtained by manually converting the connection expression to the relation label and the triple {phrase 1, phrase 2, relation label} obtained by the extraction method 2 are combined and output. M types of labels are finally output.

When the above extraction method 3 is used, the relationship estimation device 100 uses a triple {phrase 1, phrase 2, relation label} as input.

(Extraction Method 4)

A triple {phrase 1, phrase 2, relation label} obtained by manually converting the connection expression to the relation label and a triple {phrase 1, phrase 2, connection expression} obtained by the extraction method 1 are combined and output. N+M types of labels are finally output.

When the above extraction method 4 is used, the relationship estimation device 100 uses a triple {phrase 1, phrase 2, connection expression} or a triple {phrase 1, phrase 2, relation label} as input.

The learning unit 63 uses the triple {phrase 1, phrase 2, label} extracted by the learning data generation unit 62 as correct learning data to learn the relationship estimation model.

As described above, the relationship estimation model uses a neural network (hereinafter referred to as NN) such as a multilayer perceptron to perform loss calculation by the following method and then to update NN parameters.

Note that the data used for learning is used by adding a negative example, and the data obtained by randomly replacing one element of the triple of the positive example is called the negative example.

(Loss Calculation Method 1)

In correspondence with the above described relation score calculation method 1, loss calculation is performed by the following formula.

$$\text{Loss\_triple(hinge)} = \Sigma \max(0, 1 + \text{score}(h,t,r) - \text{score}(h',t',r')) \quad \text{[Formula 1]}$$

In the above expression, score(h',t',r') represents the score of the negative example. hinge loss, sigmoid loss, softmax loss, and the like may be used for loss calculation.

(Loss Calculation Method 2)

In correspondence with the above described relation score calculation method 2, loss calculation is performed by the following formula.

$$\text{Loss\_triple(hinge)} = \Sigma \max(0, 1 - \|E\_hr - E\_t\| - \|E\_h'r' - E\_t'\|) \quad \text{[Formula 2]}$$

In the above expression, E_h'r'−E_t' represents the score of the negative example. hinge loss, sigmoid loss, softmax loss, and the like may be used for loss calculation.

<Operation of the Relationship Estimation Model Learning Device According to the First Embodiment of the Present Invention>

Figure 9:
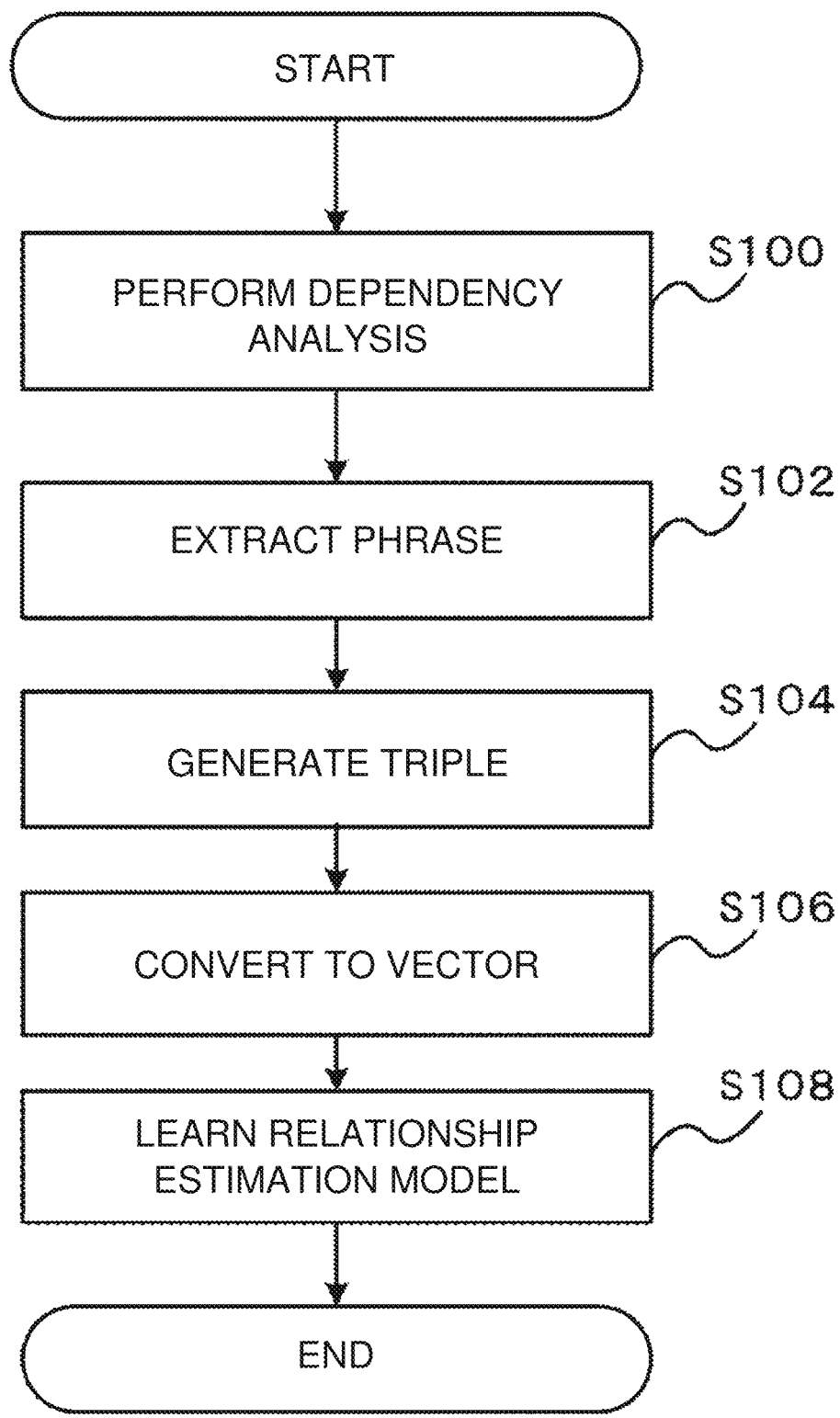
FIG. 9 is a flowchart illustrating a relationship estimation model learning processing routine of the relationship estimation model learning device according to the first embodiment of the present invention.

Then, the operation of the relationship estimation model learning device 150 according to the first embodiment of the present invention will be described. When the input unit 50 receives an input text, the relationship estimation model learning device 150 performs the relationship estimation model learning processing routine as illustrated in FIG. 9.

First, in step S100, dependency analysis is performed on the input text.

Then, in step S102, a phrase is extracted based on the dependency analysis result for the input text.

In step S104, a phrase in a dependency relation with a segment containing the connection expression is extracted from a pair of phrases extracted in step S102, to generate a triple consisting of {phrase 1, phrase 2, label}.

In step S106, the phrase 1, the phrase 2, and the label contained in the triple generated in step S104 are converted to the respective vectors.

Then, in step S108, the results obtained by converting the triple {phrase 1, phrase 2, label} to the respective vectors are used as correct learning data, to learn the relationship estimation model. Then, the relationship estimation model learning processing routine ends.

<Operation of the Relationship Estimation Device According to the First Embodiment of the Present Invention>

Figure 10:
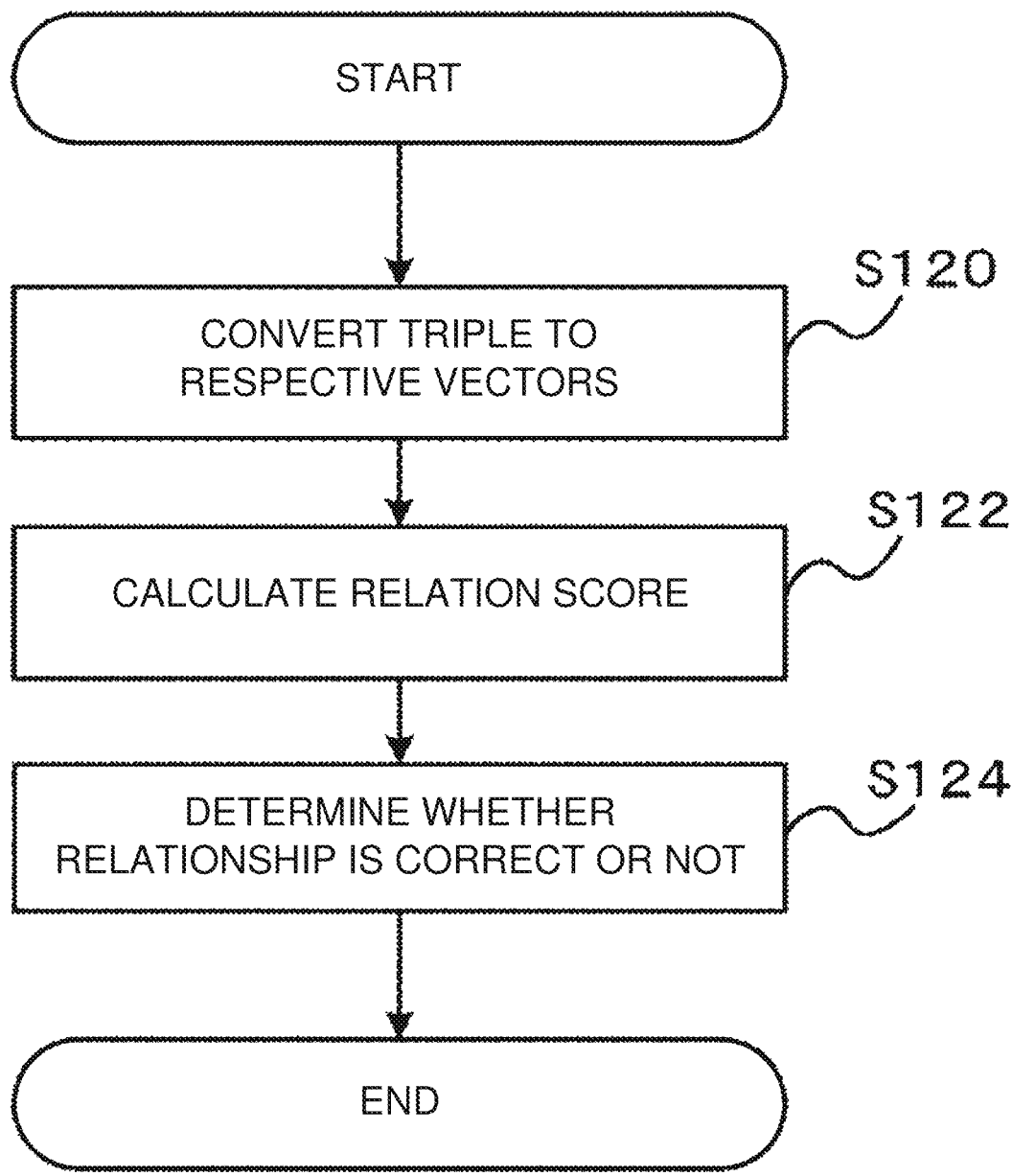
FIG. 10 is a flowchart illustrating a relationship estimation processing routine of the relationship estimation device according to the first embodiment of the present invention.

Then, the operation of the relationship estimation device 100 according to the first embodiment of the present invention will be described. When a preliminarily learned relationship estimation model is input to the relationship estimation device 100 by the relationship estimation model learning device 150, the relationship estimation device 100 stores the relationship estimation model in the storage unit 22. Then, when the input unit 10 receives a triple {phrase 1, phrase 2, label} to be estimated, the relationship estimation device 100 performs the relationship estimation processing routine illustrated in FIG. 10.

In step S120, the phrase 1, the phrase 2, and the label contained in the triple received by the input unit 10 are converted to the respective vectors.

In step S122, based on the results obtained by converting the triple {phrase 1, phrase 2, label} to the respective vectors in step S120 and the relationship estimation model, the relation score is calculated.

In step S124, a determination is made whether or not the relation score calculated in step S122 is equal to or greater than a predetermined threshold, thereby to determine whether or not the phrase 1 and the phrase 2 have a relationship indicated by the label, and then to output the determination result from the output unit 40. Then, the relationship estimation processing routine ends.

As described above, based on the dependency analysis results for the input text, the relationship estimation model learning device according to the first embodiment of the present invention extracts a pair of phrases having a predetermined relationship with a segment containing a connection expression representing a relationship between phrases, and generates a triple consisting of the pair of phrases, and a connection expression or a relation label. Thus, it is possible to learn the relationship estimation model that can accurately estimate the relationship between phrases without incurring the cost of generating learning data.

Further, when the extraction method 1 or 2 is used, data of the triple extracted from the input text using the connection expression is used as learning data to build a neural relation knowledge estimation model of the phrase. By so doing, the neural relationship can be modeled based on the connection expression without manual data. Furthermore, a model can be built for calculating the relation score of a triple consisting of a predetermined relation label and arbitrary phrases without manual correct data.

The extraction method 2 can be used to estimate an abstract relationship such as "cause" instead of the connection expression itself such as "node".

Further, the extraction method 3 can be used to learn by correcting an error based on manually provided data even if the connection expression and the relation label do not correspond one-to-one (for example, the connection expression is "tame" and the relation label is "cause" and "purpose").

Further, the extraction method 4 can used to estimate both the connection expression itself such as "node" and the abstract relationship such as "cause". Furthermore, the extraction method 4 can be used to obtain the effect of the extraction method 3. In a pattern that mixes a manually associated label and a connection expression, the extraction method 4 can be used to build a model that can simultaneously consider a reliable label that can be manually converted and another label that cannot be manually converted.

Further, the relationship estimation device according to the first embodiment of the present invention can accurately estimate the relationship between phrases.

Second Embodiment

<Principle of the Second Embodiment of the Present Invention>

Figure 11:
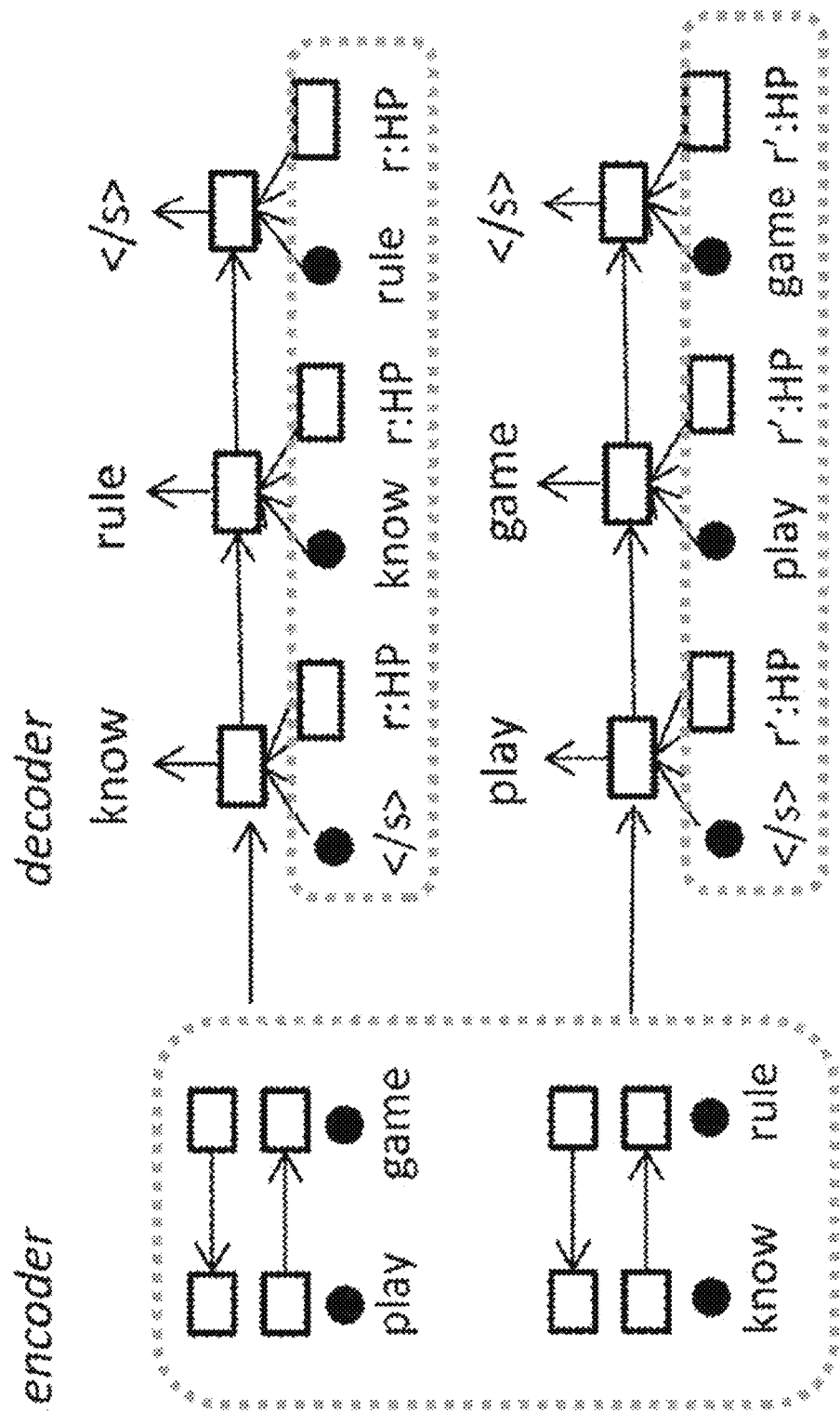
FIG. 11 is a diagram illustrating an example of a phrase generation model.

First, a description will be given of a model that generates a phrase having a relationship with an input phrase. In order to generate the phrase, the present embodiment uses, as the phrase generation model, an attention-based encoder-decoder model in a neural network (see FIG. 11). Further, this model is different from the conventional model in that information on the relation label is considered in addition to the conventional attention-based encoder-decoder model. The encoder-decoder model is a neural network including a neural network (hereinafter referred to as "encoder") that has the function of converting information corresponding to text into an intermediate state (vector sequence, hereinafter also referred to as an intermediate output); and a neural network (hereinafter referred to as "decoder") that has the function of converting the intermediate output to text. The decoder uses the label r as input for each time.

Since the phrase includes not only a word sequence but also information on label r, the present embodiment builds an encoder-decoder model considering the relation label. Here, assuming that the word vector sequence of an input phrase is represented by $$X=(x_1, x_2, \ldots, x_J),$$

and the word vector sequence of an output phrase is represented by $$Y=(y_1, y_2, \ldots, y_T),$$

the output probability of Y can be formulated as follows.

[Formula 3]

$$p(Y \mid X, \theta) = \prod_{t=1}^{T} p(y_t \mid y_{<t}, c_t, r) \quad (1)$$

$$p(y_t \mid y_{<t}, c_t, r) = g(y_{t-1}, s_t, c_t, r) \quad (2)$$

$$s_t = LSTM(concat(v_{y_{t-1}}, v_r), s_{t-1}) \quad (3)$$

Here, $x_j$ and $v_t$ are obtained by converting words included in the input and output phrases to respective predetermined dimensional vectors. A general conversion method used when a word is input to a neural network may be used as the method of converting words to respective predetermined dimensional vectors. The input and output phrases form a word vector sequence.

$v_r$ is a predetermined dimensional vector corresponding to the label. The label is converted to a vector, for example, as follows.

1. The number of label types is set to M, and a number from 1 to M to each label.
2. The vector $v_r$ is obtained by weighting the M-dimensional one-hot vector r, where the element of the number assigned to the label is 1 and the other elements are 0, using the neural network parameter matrix.

As described above, the neural network parameters used to convert words and labels to vector expressions for use in the neural network are hereinafter referred to as embedding.

$c_t$ denotes an attention-weighted context vector on the input side, and $s_t$ denotes an intermediate output of an LSTM hidden layer. As described above, $v_r$ is combined and used as the input to the decoder. A method similar to the above method of inputting a label as additional information to the decoder side has been proposed by Non-Patent Document 4 or the like. However, there has been proposed no existing method like the one using the present configuration to generate phrases. The parameter θ denotes a set of parameters that can be learned by the neural network, and is obtained by learning.

[Non-Patent Literature 4] Jiwei Li, Michel Galley, Chris Brockett, Georgios Spithourakis, Jianfeng Gao, and Bill Dolan. A workera-based neural conversation model. In Proceedings of the 54th Annual Meeting of the ACL, pp. 994-1003, 2016.

The present embodiment requires the encoder-decoder model parameters of the phrase generation device 200 to be learned in advance. A triple data is used as the learning data. When a triple data is used, it does not matter which phrase is input. Thus, learning is also performed on data using a set of {phrase 1, phrase 2, label}, in which the input and the output are switched, such as between a case in which {phrase 1, label: r} is used as input to estimate {phrase 2} and a case in which {phrase 2, label: r'} is used as input to estimate {phrase 1}. At this time, the relationship represented by the label has a direction, and thus a reverse label r' is newly introduced. Therefore, in the encoder-decoder model, the number of vocabularies of the relation label is twice the number of vocabularies of the original label.

As in the normal encoder-decoder model, a cross entropy function is used to express a loss function $L_{encdec}$ of the encoder-decoder as follows:

[Formula 4]

$$L_{encdec} = -\frac{1}{N}\sum_{n=1}^{N}\sum_{t=1}^{T} \log p(y_t^{(n)} | y_{<t}^{(n)}, c_t^{(n)}, r^{(n)}) \quad (4)$$

Here, N is the number of data, L is the number of words in the phrase Y on the output side, $c_t$ is the context vector on the input side, and r is the label.

<Configuration of the Phrase Generation Device According to the Second Embodiment of the Present Invention>

Figure 12:
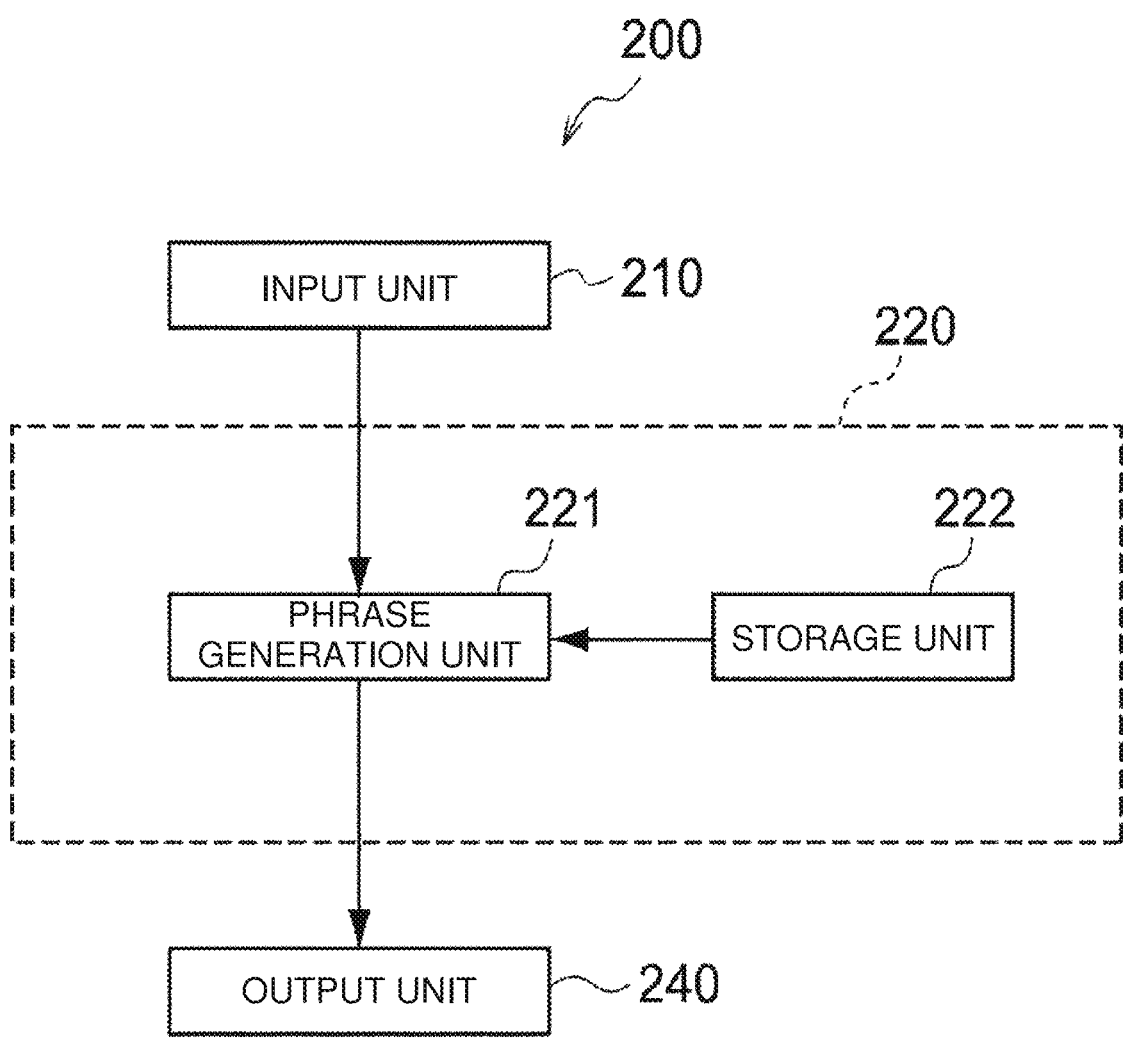
FIG. 12 is a block diagram illustrating a configuration of a phrase generation device according to a second embodiment of the present invention.

Then, the configuration of the phrase generation device according to the second embodiment of the present invention will be described. As illustrated in FIG. 12, the phrase generation device 200 according to the second embodiment of the present invention can be configured by a computer including a CPU, a RAM, and a ROM storing programs and various data for executing a phrase generation processing routine to be described later. The phrase generation device 200 functionally includes an input unit 210, a calculation unit 220, and an output unit 240 as illustrated in FIG. 12.

The input unit 210 receives a pair consisting of an input phrase (text) and a label representing a relationship between phrases.

The calculation unit 220 includes a phrase generation unit 221 and a storage unit 222.

The storage unit 222 stores a phrase generation model learned by a phrase generation model learning device to be described later.

As described above, an attention-based encoder-decoder model (see FIG. 11) is used for the phrase generation model, and the learning method will be described later with the phrase generation model learning device.

The phrase generation unit 221 uses the phrase generation model stored in the storage unit 222, to generate a phrase having a relationship represented by the label with respect to the input pair of input phrases, and then to output the phrase from the output unit 240.

Specifically, first, the LSTM of the encoder is used to convert an input phrase to a vector. Then, the attention-based decoder is used to generate a phrase from the converted vector and the vector represented by the input label, and then to output the phrase as the phrase having the relationship represented by the label with respect to the input phrase.

<Configuration of the Phrase Generation Model Learning Device According to the Second Embodiment of the Present Invention>

Then, the configuration of the phrase generation model learning device according to the second embodiment of the present invention will be described. It should be noted that the configuration of this phrase generation model learning device is the same as that of the relationship estimation model learning device 150 according to the first embodiment of the present invention, and thus the same reference numerals or characters are assigned to the same components as those of the first embodiment, and the description is omitted.

The phrase generation model learning device according to the second embodiment of the present invention includes an input unit 50, a calculation unit 60, and an output unit 90.

The learning unit 63 of the calculation unit 60 uses the triple {phrase 1, phrase 2, label} extracted by the learning data generation unit 62 as the learning data, to learn the phrase generation model.

As described above, the phrase generation model is assumed such that the attention-based encoder-decoder model is used to calculate the loss functions in the formula (4), and then to update the parameters of the encoder and the decoder.

Further, when there is a triple {phrase 1, phrase 2, label}, the phrase 2 is generated from a pair {phrase 1, label} and the phrase 1 is generated from a pair {phrase 2, label} by learning with one phrase generation model.

In order to handle the relationship in both directions with one phrase generation model, the label in the opposite direction is defined, and the label space is doubled to perform model learning.

When the original connection expression label $r=r_k$ in the triple expression, the opposite label is treated as a new label $r_k'$.

For example, a triple (phrase 1=tesuto o ukeru (take a test), phrase 2=benkyo suru (study), label=tameni [particle]) is given, the following two pairs are generated and used as learning data.

A pair {tesuto o ukeru (take a test), tameni [particle]}->benkyo suru (study).

A pair {benkyo suru (study), tameni' [particle]}->tesuto o ukeru (take a test).

<Operation of the Phrase Generation Model Learning Device According to the Second Embodiment of the Present Invention>

Then, the operation of the phrase generation model learning device according to the second embodiment of the present invention will be described. When the input unit 50 receives an input text, the phrase generation model learning device performs the same processing routine as the relationship estimation model learning processing routine as illustrated in FIG. 9. Then, the pair {phrase 1, label}->phrase 2 and the pair {phrase 2, label'}->phrase 1 obtained from the generated triple {phrase 1, phrase 2, label} are used as the correct learning data to learn the phrase generation model.

<Operation of the Phrase Generation Device According to the Second Embodiment of the Present Invention>

Figure 13:
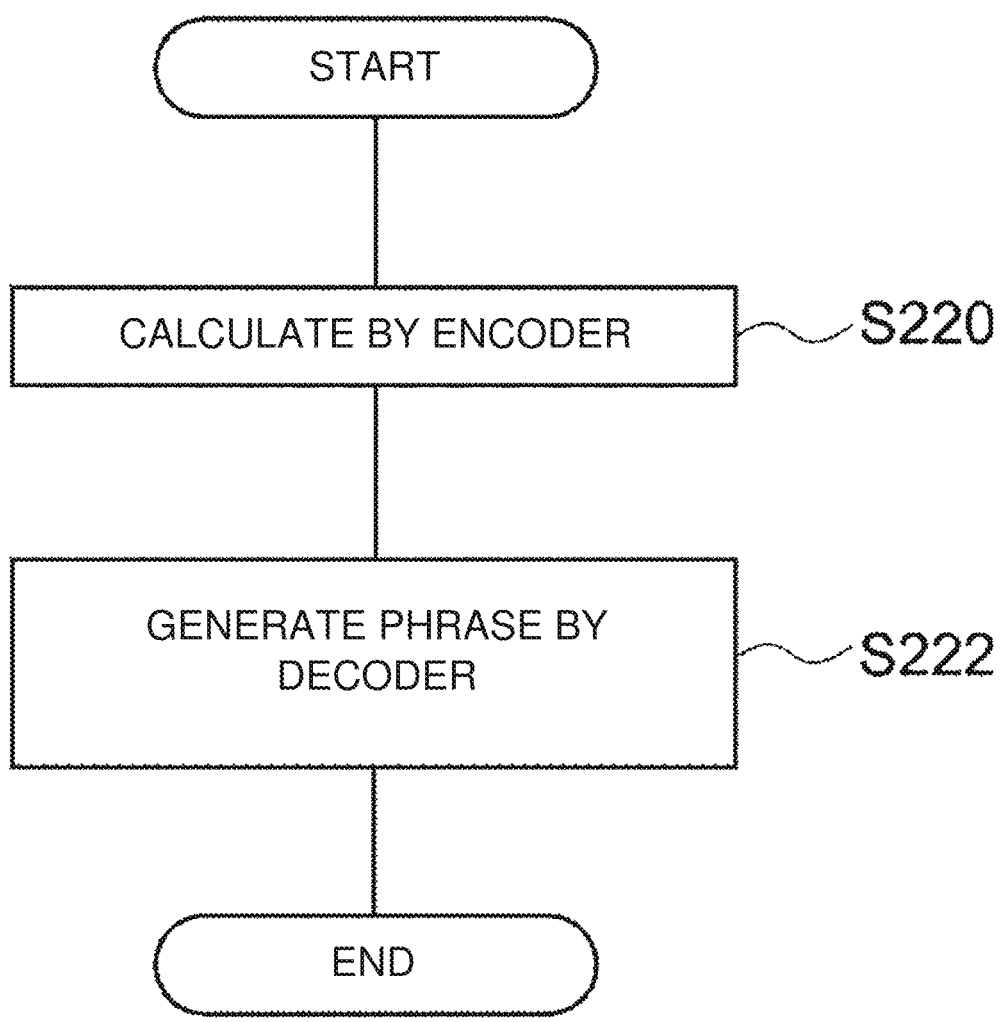
FIG. 13 is a flowchart illustrating a phrase generation processing routine of the phrase generation device according to the second embodiment of the present invention.

Then, the operation of the phrase generation device 200 according to the second embodiment of the present invention will be described. When a preliminarily learned phrase generation model is input to the phrase generation device 200 by the phrase generation model learning device, the phrase generation device 200 stores the phrase generation model in the storage unit 222. Then, when the input unit 210 receives the pair {phrase 1, label} to be estimated, the phrase generation device 200 performs the phrase generation processing routine illustrated in FIG. 13.

In step S220, the phrase 1 contained in the pair received by the input unit 210 is converted to the vector by the LSTM of the encoder of the phrase generation model.

In step S222, the attention-based decoder of the phrase generation model is used to generate a phrase from the vector converted in step S220 and the vector representing the label contained in the pair, and then to output the phrase as the phrase 2 having the relationship represented by the label with respect to the phrase 1 from the output unit 240. Then, the phrase generation processing routine ends.

As described above, the phrase generation model learning device according to the second embodiment of the present invention learns a phrase generation model including an encoder that converts a phrase to a vector; and a decoder that from the converted vector and the connection expression or a relation label, generates a phrase having the relationship represented by the connection expression or the relation label with respect to the phrase. Thus, it is possible to learn the phrase generation model that can generate a phrase having a relationship with an input phrase.

Until now, it has been necessary to preliminarily prepare a phrase candidate having a relationship, but it is possible to learn a phrase generation model that can generate a phrase having a relationship without preparing a candidate in advance.

Further, the phrase generation device according to the second embodiment of the present invention uses a phrase generation model including an encoder that converts a phrase to a vector from a pair consisting of a phrase and a connection expression or a relation label; and a decoder that from the converted vector and the connection expression or the relation label, generates a phrase having the relationship represented by the connection expression or the relation label with respect to the phrase. Thus, it is possible to generate a phrase having a relationship with an input phrase.

Further, a different phrase depending on the label can be generated by treating the label as additional input to the encoder-decoder model.

Third Embodiment

<Principle of the Third Embodiment of the Present Invention>

Figure 14:
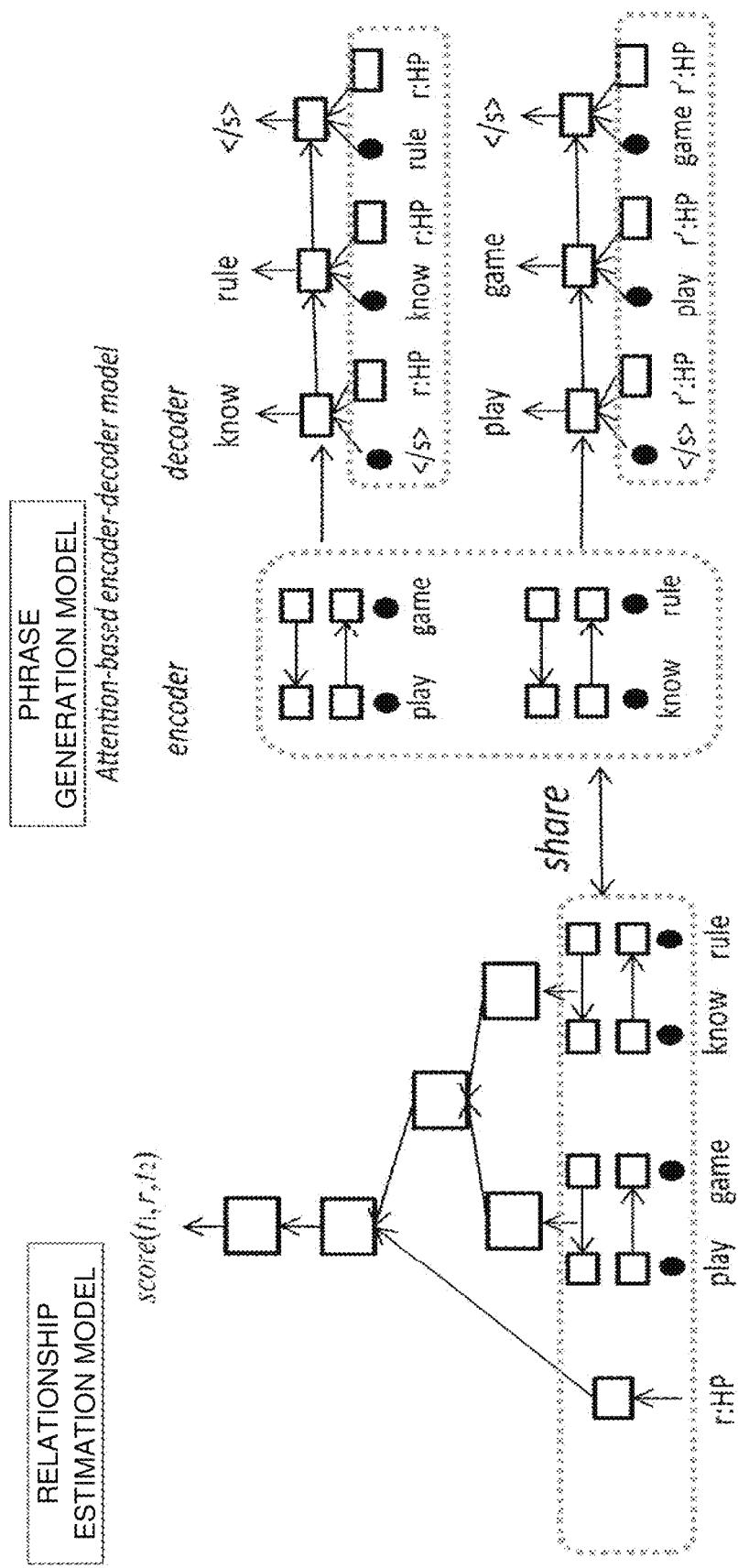
FIG. 14 is a diagram illustrating an example of a relationship estimation model and a phrase generation model.

The third embodiment of the present invention simultaneously learns a relationship estimation model and a phrase generation model as illustrated in FIG. 14. Specifically, the relationship estimation model and the phrase generation model share an embedding for converting an input phrase to a word vector sequence and a label to a vector; and an LSTM for converting the word vector sequence to a phrase vector. The specific configuration of each model will be described below.

<Relationship Estimation Model>

First the relationship estimation model according to the third embodiment of the present invention will be described.

The basic structure of the model is similar to that of Non-Patent Literature 2, but the method of generating a vector used as input is different from that of Non-Patent Literature 2.

In the Non-Patent Literature 2, when an arbitrary triple $\{t_1, t_2, r\}$ is given, a model for estimating a relation score of the triple, that is, $\text{score}(t_1, r, t_2)$ is defined using a neural network as follows.

[Formula 5]

$$\text{score}(t_1, r, t_2) = W_2 g(W_1 v_{in} + b_1) + b_2 \tag{5}$$

Here, $$v_{in} = \text{concat}(v_{12}, v_r), v_{12} \in \mathbb{R}^d$$

is a vector expression of a word sequence obtained by concatenating $t_1$ and $t_2$.

$$v_r \in \mathbb{R}^d$$

is a vector expression of label r. g is a non-linear function, and in Non-Patent Literature 2, ReLU is used. The score of the last layer is assumed to be a one-dimensional output. These can be considered as a model in which when an arbitrary triple is given, a determination is made as to whether the triple is correct or not.

The relationship estimation model of the present embodiment also defines a relationship estimation model using the same formulation as described above, but the modeling of $v_{in}$ is different from that of Non-Patent Literature 2. Non-Patent Literature 2 discloses a simple modeling method of two types: word vector averaging and LSTM maxpooling as a vector expression of a phrase. On the other hand, the relationship estimation model of the present embodiment defines the vector of each phrase using LSTM attention pooling as follows. Here, $x^i_j$ and $h^i_j$ denote the embedding and the hidden layer vector of LSTM of the j-th word of phrase $t_i$, respectively.

[Formula 6]

$$h^i_j = \text{BiLSTM}(x^i_j, h^i_{j-1})(i = 1, 2) \tag{6}$$

$$v_i = \sum_{j=1}^{J} \frac{\exp(e_t)}{\sum_{k=1}^{J} \exp(e_k)} h^i_j \tag{7}$$

$$e_k = v^\top \tanh(W h_k) \tag{8}$$

$$v_{12} = \text{Bilinear}(v_1, v_2) \tag{9}$$

$$v_{in} = \text{concat}(v_{12}, v_r) \tag{10}$$

$v_{in}$ performs batch normalization and dropout, and passes it to the upper layer. The LSTM for vectorizing each phrase and embedding of words and labels are shared with the phrase generation model described in the second embodiment.

<Learning>
<Loss Function>

The present embodiment performs learning while simultaneously considering the loss functions of the relationship estimation model and the phrase generation model. Specifically, learning is performed using the loss function shown in the following formula.

$$L(\theta) = L_{triple} + \lambda L_{encdec}$$

Here, θ denotes a model parameter, $L_{triple}$ denotes a loss function on the relationship estimation model, $L_{encdec}$ denotes a loss function on the phrase generation model. The loss function $L_{triple}$ of the relationship estimation model is expressed by the following formula using binary cross entropy having the highest accuracy from the results of Non-Patent Literature 2 by Li et al.

[Formula 8]

$$L_{triple}(\tau, l) = -\frac{1}{N} \sum_{n=1}^{N} (l \log \sigma(\text{score}(\tau)) + (1-l)\log(1 - \sigma(\text{score}(\tau)))) \quad (12)$$

Here, τ is a variable representing a tripe, 1 is a binary variable that is 1 for positive examples and 0 for negative examples, and a is a sigmoid function. In the above formulation, learning is performed such that the score of a positive example is closer to 1 and the score of a negative example is closer to 0 for an arbitrary triple τ={$t_1$, $t_2$, r}.

The loss functions of the encoder and the decoder of the phrase generation model are the same as those of the second embodiment.

<Negative Example Sampling>

When binary cross entropy is used to learn a binary classification model, a negative example needs to be provided. The present embodiment uses random sampling having the highest accuracy in the study of Non-Patent Literature 2, to generate a negative example. Specifically, there is provided a triple data τ={$t_1$, $t_2$, r}, each consisting of a positive example, and then $t_1$, $t_2$, and r are randomly replaced one by one, to generate data $\tau_{neg1}$={$t_1$', $t_2$, r}, $T_{neg2}$={$t_1$, $t_2$, r'}, and $\tau_{neg3}$={$t_1$, $t_2$', r}. $t_1$' and $t_2$' subject to random sampling are sampled from candidates that appear during learning, and r' is sampled from all label candidates. Therefore, during learning, learning is performed while sampling three negative examples for each positive example. However, the negative examples are used only for the relationship estimation model. The phrase generation model needs to learn from a correct triple, and thus learns only from the triple consisting of positive examples.

<Configuration of the Phrase Generation Relationship Estimation Model Learning Device According to the Third Embodiment of the Present Invention>

Then, the configuration of the phrase generation relationship estimation model learning device according to the third embodiment of the present invention will be described. It should be noted that the configuration of this phrase generation relationship estimation model learning device is the same as that of the relationship estimation model learning device according to the first embodiment of the present invention, and thus the same reference numerals or characters are assigned to the same components as those of the first embodiment, and the description is omitted.

The phrase generation relationship estimation model learning device according to the third embodiment of the present invention includes an input unit 50, a calculation unit 60, and an output unit 90.

The learning unit 63 of the calculation unit 60, first, uses a triple {phrase 1, phrase 2, label} extracted by the learning data generation unit 62; and a pair {phrase 1, label}->phrase 2 and a pair {phrase 2, label'}->phrase 1 obtained from the triple {phrase 1, phrase 2, label} as correct learning data. Then, the learning unit 63 of the calculation unit 60 further uses a negative example obtained from the triple {phrase 1, phrase 2, label}. Then, the learning unit 63 of the calculation unit 60 simultaneously learns a phrase generation model including an encoder that converts a phrase to a vector and a decoder that based on the converted vector and label, generates a phrase having a relationship represented by the label with respect to the phrase; and a relationship estimation model which is a neural network that outputs a relation score from the vectors that are converted by the common encoder and represent the respective phrases contained in the pair of phrases, and the vector representing the label.

Specifically, the parameters of the phrase generation model and the relationship estimation model are updated so as to minimize the loss function of the above formula (11).

<Configuration of the Phrase Generation Device According to the Third Embodiment of the Present Invention>

Then, the configuration of the phrase generation device according to the third embodiment of the present invention will be described. It should be noted that the same reference numerals or characters are assigned to the same components as those of the second embodiment, and the description is omitted.

Figure 15:
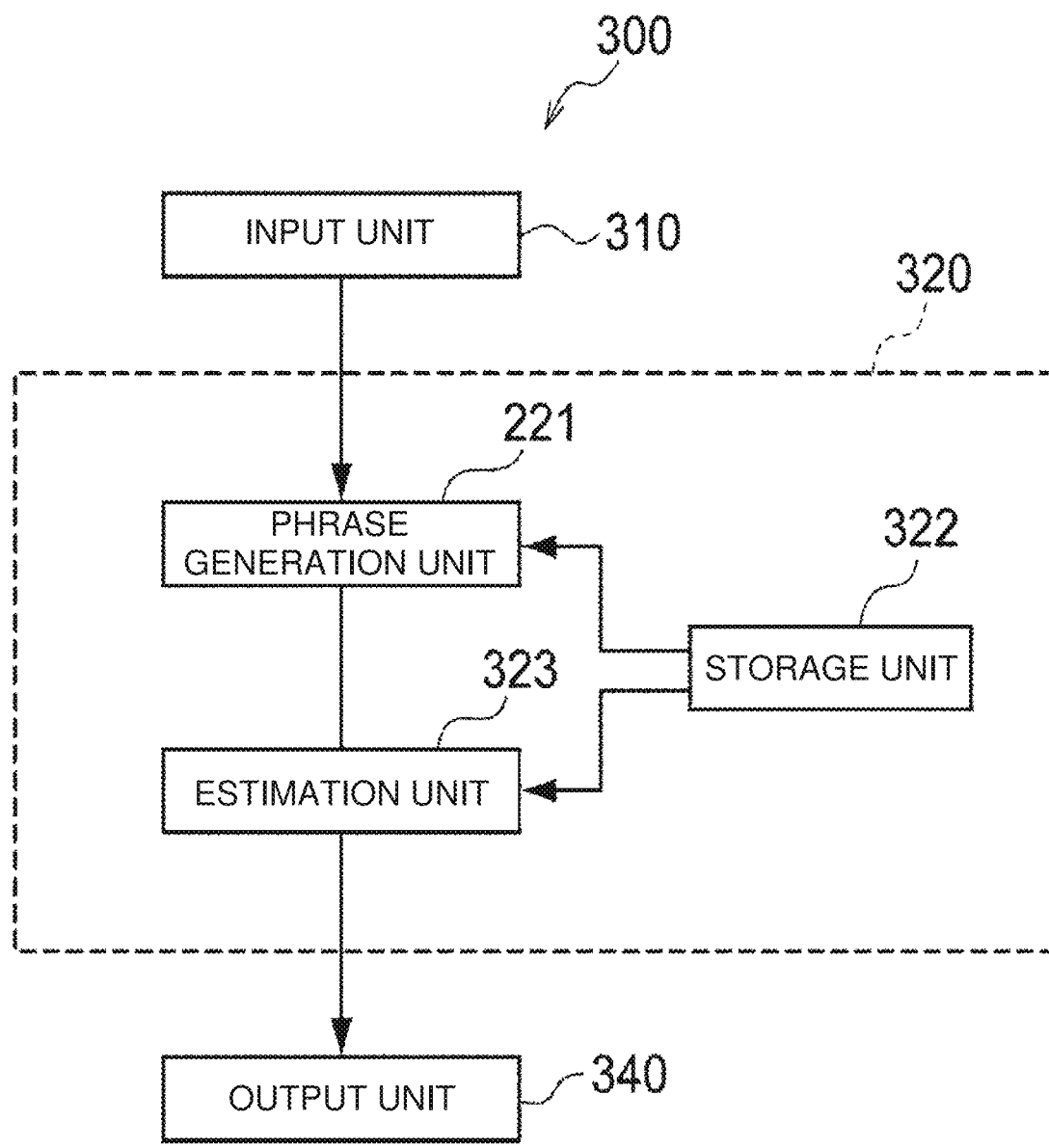
FIG. 15 is a block diagram illustrating a configuration of a phrase generation device according to a third embodiment of the present invention.

As illustrated in FIG. 15, the phrase generation device 300 according to the third embodiment of the present invention can be configured by a computer including a CPU, a RAM, and a ROM storing programs and various data for executing a phrase generation processing routine to be described later. The phrase generation device 300 functionally includes an input unit 310, a calculation unit 320, and an output unit 340 as illustrated in FIG. 15.

The input unit 310 receives a pair consisting of an input phrase (text) and a label representing a relationship between phrases.

The calculation unit 320 includes a phrase generation unit 221, a storage unit 322, and an estimation unit 323.

The storage unit 322 stores the relationship estimation model and the phrase generation model learned by the phrase generation relationship estimation model learning device.

As illustrated in FIG. 14, the phrase generation model is assumed to use the attention-based encoder-decoder model as described above; and the relationship estimation model is assumed to use a neural network model that converts each phrase vector using LSTM attention pooling as described above.

The phrase generation unit 221 uses the phrase generation model stored in the storage unit 322, to generate a phrase having a relationship represented by the label with respect to the input pair of input phrases, and then to output the phrase to the estimation unit 323.

The estimation unit 323 uses the relationship estimation model stored in the storage unit 322, to estimate the relation score of the triple consisting of the input pair and the phrase generated by the phrase generation unit 221, and then to output the relation score from the output unit 340.

At this time, the relationship estimation model uses the encoder of the phrase generation model and the common neural network, to convert the phrases to the respective vectors, and then to estimate the relation score from the vectors representing the respective phrases and the vector representing the label.

<Operation of the Phrase Generation Relationship Estimation Model Learning Device According to the Third Embodiment of the Present Invention>

Then, the operation of the phrase generation relationship estimation model learning device according to the third embodiment of the present invention will be described. When the input unit 310 receives an input text, the phrase generation relationship estimation model learning device performs the same processing routine as the relationship estimation model learning processing routine illustrated in FIG. 9. At this time, the generated triple {phrase 1, phrase 2, label}; and the pair {phrase 1, label}->phrase 2 and the pair {phrase 2, label'}->phrase 1 obtained from the triple {phrase 1, phrase 2, label} are used as correct learning data. Then, the negative example obtained from the triple {phrase 1, phrase 2, label} is further used to simultaneously learn the relationship estimation model and the phrase generation model.

<Operation of the Phrase Generation Device According to the Third Embodiment of the Present Invention>

Figure 16:
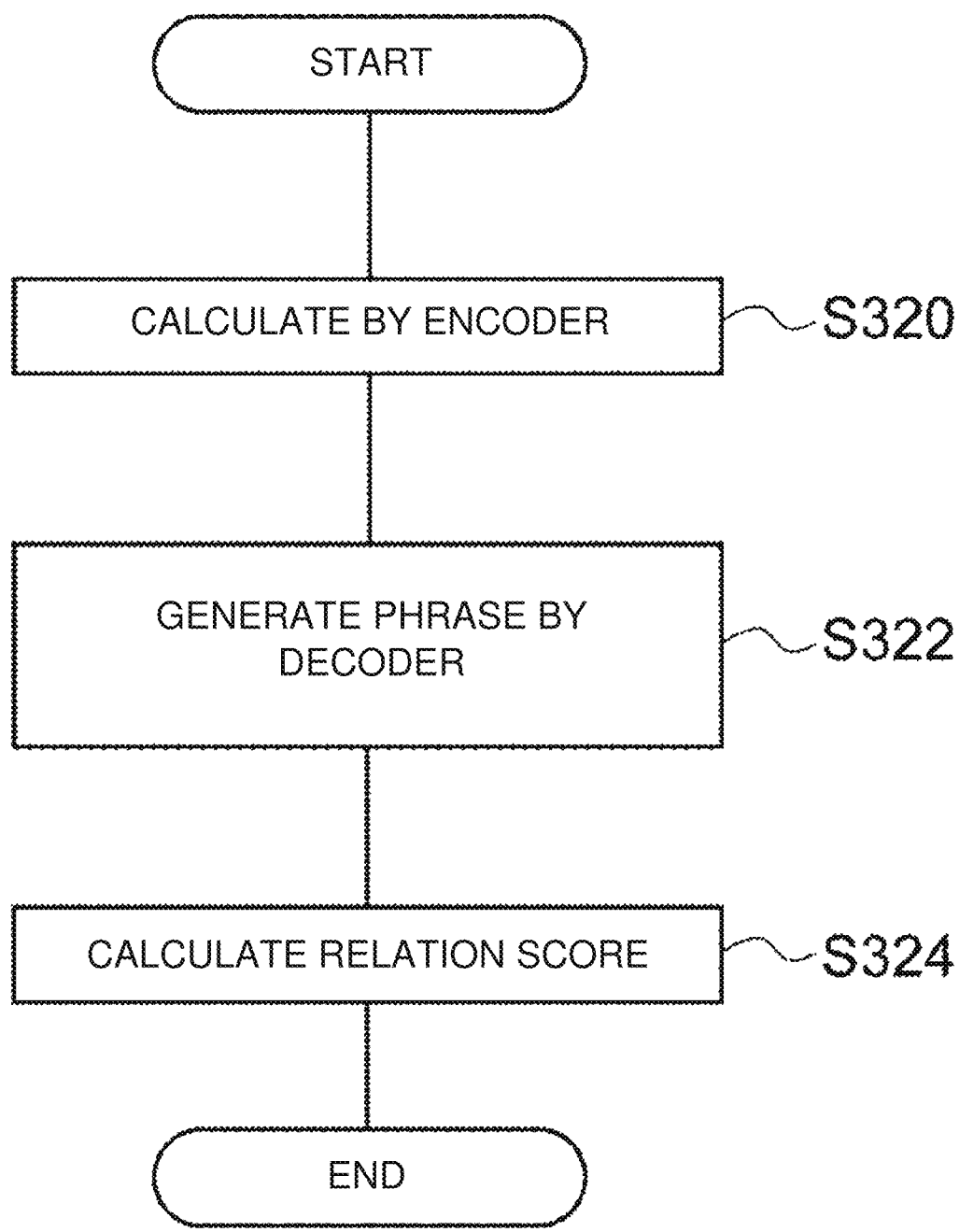
FIG. 16 is a flowchart illustrating a phrase generation processing routine of a phrase generation device according to the third embodiment of the present invention.

Then, the operation of the phrase generation device 300 according to the third embodiment of the present invention will be described. When the preliminarily learned relationship estimation model and phrase generation model are input to the phrase generation device 300 by the phrase generation relationship estimation model learning device, the phrase generation device 300 stores the relationship estimation model and the phrase generation model in the storage unit 322. Then, when the input unit 310 receives the pair {phrase 1, label} to be estimated, the phrase generation device 300 performs the phrase generation processing routine illustrated in FIG. 16.

In step S320, the phrase 1 contained in the pair received by the input unit 310 is converted to the vector by the LSTM of the encoder of the phrase generation model.

In step S322, the attention-based decoder of the phrase generation model is used to generate a phrase from the vector converted in step S320 and the vector representing the label contained in the pair, and then to use the generated label as the phrase 2 having the relationship represented by the label with respect to the phrase 1.

In step S324, based on the triple consisting of the pair received by the input unit 310 and the phrase generated in step S322, and the relationship estimation model, the relation score is calculated. Then, the calculated relation score and the triple are output from the output unit 340. Then, the phrase generation processing routine ends.

As described above, the phrase generation relationship estimation model learning device according to the third embodiment of the present invention uses, as input, the phrase generation model including the encoder that converts a phrase to a vector and the decoder that generates a phrase having the relationship represented by the connection expression or the relation label with respect to the phrase; and the vectors representing the respective phrases contained in the pair of phrases, and the vector representing the connection expression or the relation label, which are converted using the encoder. By learning the relationship estimation model that outputs the relation score, it is possible to simultaneously learn the relationship estimation model that can accurately estimate a relationship between phrases and the phrase generation model that can generate a phrase having a relationship with an input phrase. Further, the simultaneous learning of the phrase generation model and the relationship estimation model that share a part of the neural network improves the accuracy of the relationship estimation model of the triple.

Further, the phrase generation device according to the third embodiment of the present invention uses the phrase generation model including the encoder that converts a phrase to a vector and the decoder that generates a phrase having the relationship represented by the connection expression or the relation label with respect to the phrase, to generate a phrase having a relationship with an input phrase; and uses the relationship estimation model that outputs a relation score, to estimate the relation score. Thereby, it is possible to generate a phrase having a relationship with an input phrase.

<Experiment>
<Experimental Data>

Experimental data uses ConceptNet (English) data disclosed in Non-Patent Literature 2 and Japanese open domain data uniquely annotated by the inventors. Table 1 shows an overview of each data.

TABLE 1

|  | ConceptNet | Ja |
| --- | --- | --- |
| train | 100,000 | 192,714 |
| validation 1 | 1,200 | 6,889 |
| validation 2 | 1,200 | — |
| test | 2,400 | 6,889 |
| number of relation labels | 34 | 7 |
| number of vocabularies | 21,471 | 18,119 |
| number of average words in phrase | 2.02 | 3.96 |

The number of labels in the ConceptNet data is greater than that in the Japanese open domain data. The number of vocabularies is about 20,000 for both data, but the average word length in a phrase is about twice as long for Japanese data as for ConceptNet data. For Japanese data, a triple $\{t_1, t_2, r\}$ related to frequent words crawled from the web was generated using crowdsourcing. In order to remove noisy data, there was provided a triple $\{t_1, t_2, r\}$ generated by a worker. Then, three other workers were asked to perform a task of selecting an appropriate r while r is hidden. As a result, only data where two or more workers selected the same label was used. Test data and validation data were randomly selected from the data where all workers selected the same r, and the other data was used as learning data. The Japanese test data and validation data were generated so that the positive and negative examples were 1:1 as in the ConceptNet data.

Specifically, first, the positive examples were sampled, and then one of the three elements in each positive example was randomly selected and replaced with another element in the test data, to generate the data.

<Evaluation Method and Comparison Method>

As the baseline of the relationship estimation model, the methods (DNN AVG, DNN LSTM) in Non-Patent Literature 2 were used. These were such that input vector $v_{in}$ was obtained by word vector averaging and LSTM maxpooling. Note that in the LSTM model, $t_1$ and $t_2$ were separately vectorized and concatenated.

For the method proposed in the present embodiment, accuracy was evaluated in a case in which the relationship estimation model was used alone (proposed w/o EncDec)

and in a case in which both the relationship estimation model and the phrase generation model were learned simultaneously (proposed w/EncDec). The binary classification accuracy rate was used as the evaluation index. Further, regarding the test of ConceptNet, as in Non-Patent Literature 2, learning was performed using train data, adjustment of hyperparameters was performed using validation 1 data, and evaluation was performed using validation 2 and test data. Likewise, the parameters of the Japanese data were determined by train data, and validation 1 and 2 data, and evaluation was performed by test.

As the baseline of the phrase generation model, an encoder-decoder alone model (EncDec w/o relation single) without using the relation label was used. Further, this was compared with the simultaneous learning of the encoder-decoder alone model (EncDec w/relation single) considering the relation label and the relationship estimation model (EncDec w/relation Multi). The evaluation was performed by the word-level accuracy rate.

<Experimental Settings>

The parameters used in this experimental example will be described. The LSTM hidden layer and the embedding of words and labels were set to 200 dimensions; the intermediate layer of the relationship estimation model was set to 10001 dimensions; the batch size at learning was set to 128; the dropout was set to 0.2; and the weight decay was set to 0.00001. In addition, a one-layer bidirectional LSTM was used for the encoder of the phrase generation model, and a one-layer LSTM was used for the decoder. SGD was used for the optimization method, and the initial learning rate was set to 1.0, and the decay rate was set to 0.5, to perform scheduling.

The loss function 1 was fixed at 1.0. The initial value of the embedding of words and labels used a vector calculated in advance using fastText (see Non-Patent Literature 6) based on a text file obtained by combining a triple of learning data and Wikipedia®.

[Non-Patent Literature 6] Piotr Bojanowski, Edouard Grave, Armand Joulin, and Tomas Mikolov. Enriching word vectors with subword information. arXiv preprint arXiv:1607.04606, 2016.

<Experimental Results>
<Relationship Estimation>

Table 2 shows the evaluation results of the relationship estimation (binary classification).

TABLE 2

| method | ConceptNet | | Ja |
| | valid2 | test | test |
| --- | --- | --- | --- |
| base (DNN AVG) | 0.905 | 0.923 | 0.889 |
| base (DNN LSTM) | 0.910 | 0.928 | 0.877 |
| proposed w/o EncDec | 0.911 | 0.927 | 0.881 |
| proposed w/EncDec | 0.928 | 0.938 | 0.897 |
| proposed w/EncDec (+data) | 0.936 | 0.948 | — |
| proposed w/EncDec (+augdata) | — | — | 0.897 |
| Li et al [5] | 0.913 | 0.920 | — |
| Li et al (+data) [5] | 0.918 | 0.925 | — |
| human [5] | ~0.950 | — | — |

The lower rows in Table 2 show the best accuracy rates reported in the paper in Non-Patent Literature 2. Here, the rows indicated by +data show the evaluations obtained by augmenting the learning data from 100k to 300k. The results in Table 2 show that the accuracy rates of the proposed methods according to the embodiments of the present invention were higher than those of the existing methods, and the accuracy rates of the ConceptNet data exceeded the highest value of the conventional research. Particularly under the condition of augmenting the data, the accuracy rates were improved by 2% or more and was approaching the upper limit (to 0.95) by humans. It is understood from the comparison between the single model (proposed w/o EncDec) and the simultaneous learning model (proposed w/EncDec) that both the ConceptNet and Japanese data by the simultaneous learning had better accuracy rates than the data by the single model. This is probably because the loss functions of the phrase generation problem worked as a constraint for the relationship estimation problem, thus causing better phrase vectors to be obtained.

<Phrase Generation>

Table 3 shows the accuracy rates of the phrase generation model.

TABLE 3

| method | ConceptNet | | Ja |
| | valid2 | test | test |
| --- | --- | --- | --- |
| EncDec w/o relation (single) | 0.535 | 0.564 | 0.529 |
| EncDec w/relation (single) | 0.598 | 0.633 | 0.544 |
| EncDec w/relation (Muluti) | 0.602 | 0.633 | 0.542 |
| EncDec w/relation (Muluti + augdata) | — | — | 0.553 |

It is understood from the results in Table 3 that a large difference in accuracy was found between the encoder-decoder model considering the relation label as the baseline and the encoder-decoder model without considering the relation label and that the accuracy of generation was greatly improved by considering the relationship label. The accuracy of the phrase generation model is not much improved by using multitask learning, but the accuracy of the phrase generation model can be improved by adding unsupervised data.

Note that the present invention is not limited to the above described embodiments, and various modifications and applications can be made without departing from the spirit and scope of the present invention.

For example, the above embodiments have described the case where the relationship estimation device 100 and the relationship estimation model learning device 150 are configured as separate devices, but the relationship estimation device 100 and the relationship estimation model learning device 150 may be configured as one device. Further, the above embodiments have described the case where the phrase generation devices 200 and 300, the phrase generation model learning device, and the phrase generation relationship estimation model learning device are configured as separate devices, but the phrase generation devices 200 and 300, and the phrase generation model learning device may be configured as one device.

The relationship estimation model learning device, the relationship estimation device, the phrase generation device, the phrase generation model learning device, and the phrase generation relationship estimation model learning device that have been described above include a computer system therein, but in a case where the "computer system" uses a WWW system, the "computer system" is assumed to include a webpage providing environment (or display environment).

REFERENCE SIGNS LIST

10, 50, 210, 310 input unit
20, 60, 220, 320 calculation unit 21, 323 estimation unit
22, 222, 322 storage unit
40, 90, 240, 340 output unit
62 learning data generation unit
63 learning unit
71 basic analysis unit
72 phrase extraction unit
73 connection expression database
100 relationship estimation device
150 relationship estimation model learning device
200, 300 phrase generation device
221 phrase generation unit

The invention claimed is:

1. A computer-implemented method for processing phrases, the method comprising:
receiving an input text, wherein the input text includes a plurality of phrases;
extracting, based on a dependency analysis, a triplet, wherein the triplet comprises a first phrase, a second phrase, and a dependency label, and wherein the dependency label defines a first dependency relationship between the first phrase and the second phrase;
generating, by an encoder, a set of vectors, wherein the set of vectors is for training a relationship estimation model, and wherein the set of vectors comprises:
a first vector based on the first phrase,
a second vector based on the second phrase, and
a third vector based on the dependency label;
generating, by the encoder, a first pair, wherein the first pair is for training a phrase generation model, wherein the relationship estimation model and the phase generation model share at least a part of a common neural network, and wherein the first pair comprises the first vector and the third vector;
generating, by the encoder a second pair, wherein the second pair is for training the phrase generation model, wherein the second pair comprises the second vector and a fourth vector, and wherein the fourth vector is based on a reverse label of the first dependency relationship; and
generating, based on the set of vectors for training, the relationship estimation model;
using the first pair and the second pair as correct learning data, training the phrase generation model;
receiving a third phrase and a connection expression;
determining, based on the third phrase and the connection expression using the trained phrase generation model, a fourth phrase, wherein the phrase generation model once trained generates a phrase from a pair of an input phrase and an input dependency label, and wherein the fourth phrase relates to the third phrase based on the connection expression;
determining, based on the trained relationship estimation model, a relation score, wherein the trained relationship estimation model once trained estimates a type of dependency relationship between a pair of input phrases, and wherein the relation score defines a degree of a second dependency relationship between the received third phrase and the determined fourth phrase; and
providing the fourth phrase and the determined relation score in response to the received third phrase and the connection expression.

2. The computer-implemented method of claim 1, wherein the phrase generation model is based on an attention-based encode-decoder model, and the method further comprising:

training, based on the second pair for training, the phrase generation model; and
updating, based at least on a loss function relating to encoder-decoder, one or more parameters of the phrase generation model.

3. The computer-implemented method of claim 1, wherein the phrase generation model includes a decoder, wherein the decoder generates a phrase having a relationship represented by the dependency label of the triplet.

4. The computer-implemented method of claim 1, the method further comprising:
concurrently performing, for training:
generating, based on the set of vectors, the relationship estimation model; and
generating, based the first pair and the second pair, the phrase generation model.

5. The computer-implemented method of claim 1, wherein the generating the relationship estimation model and the generating the phrase generation model relates to minimizing a loss function, wherein the loss function is based on a combination of a first loss function for the relationship estimation model and a second loss function for the phrase generation model.

6. The computer-implemented method of claim 1, the method further comprising:
generating a negative example of the triplet for training; and
generating, based on the negative example of the triplet for training, the relationship estimation model.

7. A system for processing phrases, the system comprises:
a processor; and
a memory storing computer-executable instructions that when executed by the processor cause the system to:
receive an input text, wherein the input text includes a plurality of phrases;
extract, based on a dependency analysis, a triplet, wherein the triplet comprises a first phrase, a second phrase, and a dependency label, and wherein the dependency label defines a first dependency relationship between the first phrase and the second phrase;
generate, by an encoder, a set of vectors, wherein the set of vectors is for training a relationship estimation model, wherein the relationship estimation model and the phase generation model share at least a part of a common neural network, and wherein the set of vectors comprises:
a first vector based on the first phrase,
a second vector based on the second phrase, and
a third vector based on the dependency label;
generate, by the encoder, a first pair, wherein the first pair is for training a phrase generation model, wherein the relationship estimation model and the phase generation model share at least a part of a common neural network, and wherein the first pair comprises the first vector and the third vector;
generate, by the encoder a second pair, wherein the second pair is for training the phrase generation model, wherein the second pair comprises the second vector and a fourth vector, and wherein the fourth vector is based on a reverse label of the first dependency relationship; and
generate, based on the set of vectors for training, the relationship estimation model;
using the first pair and the second pair as correct learning data, train the phrase generation model;
receive a third phrase and a connection expression;

determine, based on the third phrase and the connection expression using the trained phrase generation model, a fourth phrase, wherein the phrase generation model once trained generates a phrase from a pair of an input phrase and an input dependency label, and wherein the fourth phrase relates to the third phrase based on the connection expression;

determine, based on the trained relationship estimation model, a relation score, wherein the trained relationship estimation model once trained estimates a type of dependency relationship between a pair of input phrases, and wherein the relation score defines a degree of a second dependency relationship between the received third phrase and the determined fourth phrase; and provide the fourth phrase and the determined relation score in response to the received third phrase and the connection expression.

8. The system of claim 7, wherein the phrase generation model is based on an attention-based encode-decoder model, and the computer-executable instructions when executed further causing the system to:

train, based on the second pair for training, the phrase generation model; and update, based at least on a loss function relating to encoder-decoder, one or more parameters of the phrase generation model.

9. The system of claim 7, wherein the phrase generation model includes a decoder, wherein the decoder generates a phrase having a relationship represented by the dependency label of the triple.

10. The system of claim 7, the computer-executable instructions when executed further causing the system to:

concurrently perform, for training:

generating, based on the triple, the relationship estimation model; and generating, based the first pair and the second pair, the phrase generation model.

11. The system of claim 7, wherein the generating the relationship estimation model and the generating the phrase generation model relates to minimizing a loss function, wherein the loss function is based on a combination of a first loss function for the relationship estimation model and a second loss function for the phrase generation model.

12. The system of claim 7, the computer-executable instructions when executed further causing the system to:

generate a negative example of the triple for training; and generate, based on the negative example of the triple for training, the relationship estimation model.

13. A computer-readable non-transitory recording medium storing computer-executable instructions that when executed by a processor cause a computer system to:

receive an input text, wherein the input text includes a plurality of phrases;

extract, based on a dependency analysis, a triplet, wherein the triplet comprises a first phrase, a second phrase, and a dependency label, and wherein the dependency label defines a first dependency relationship between the first phrase and the second phrase;

generate, by an encoder, a set of vectors, wherein the set of vectors is for training a relationship estimation model, and wherein the set of vectors comprises:

a first vector based on the first phrase, a second vector based on the second phrase, and a third vector based on the dependency label;

generate, by the encoder, a first pair, wherein the first pair is for training a phrase generation model, wherein the relationship estimation model and the phase generation model share a at least a part of a common neural network, and wherein the first pair comprises the first vector and the third vector;

generate, by the encoder a second pair, wherein the second pair is for training the phrase generation model, wherein the second pair comprises the second vector and a fourth vector, and wherein the fourth vector is based on a reverse label of the first dependency relationship; and generate, based on the set of vectors for training, the relationship estimation model;

using the first pair and the second pair as correct learning data, train the phrase generation model;

receive a third phrase and a connection expression;

determine, based on the third phrase and the connection expression using the trained phrase generation model, a fourth phrase, wherein the phrase generation model once trained generates a phrase from a pair of an input phrase and an input dependency label, and wherein the fourth phrase relates to the third phrase based on the connection expression;

determine, based on the trained relationship estimation model, a relation score, wherein the trained relationship estimation model once trained estimates a type of dependency relationship between a pair of input phrases, and wherein the relation score defines a degree of a second dependency relationship between the received third phrase and the determined fourth phrase; and provide the fourth phrase and the determined relation score in response to the received third phrase and the connection expression.

14. The computer-readable non-transitory recording medium of claim 13, wherein the phrase generation model is based on an attention-based encode-decoder model, and the computer-executable instructions when executed further causing the system to:

train, based on the second pair for training, the phrase generation model; and update, based at least on a loss function relating to encoder-decoder, one or more parameters of the phrase generation model.

15. The computer-readable non-transitory recording medium of claim 13, wherein the phrase generation model includes a decoder, wherein the decoder generates a phrase having a relationship represented by the dependency label of the triple.

16. The computer-readable non-transitory recording medium of claim 13, the computer-executable instructions when executed further causing the system to:

concurrently perform, for training:

generating, based on the triple, the relationship estimation model; and generating, based the first pair and the second pair, the phrase generation model.

17. The computer-readable non-transitory recording medium of claim 13, the computer-executable instructions when executed further causing the system to:

generate a negative example of the triple for training; and generate, based on the negative example of the triple for training, the relationship estimation model.

* * * * *